US009352573B1

(12) United States Patent
Turgeman

(10) Patent No.: US 9,352,573 B1
(45) Date of Patent: May 31, 2016

(54) INK PRINTING SYSTEM COMPRISING GROUPS OF INKS, EACH GROUP HAVING A UNIQUE INKBASE COMPOSITION

(71) Applicant: Shahar Turgeman, Boca Raton, FL (US)

(72) Inventor: Shahar Turgeman, Boca Raton, FL (US)

( * ) Notice: Subject to any disclaimer, the term of this patent is extended or adjusted under 35 U.S.C. 154(b) by 0 days.

(21) Appl. No.: 14/630,589

(22) Filed: Feb. 24, 2015

Related U.S. Application Data

(63) Continuation-in-part of application No. 14/011,683, filed on Aug. 27, 2013, now Pat. No. 8,960,868, which is a continuation-in-part of application No. 13/851,067, filed on Mar. 26, 2013, now Pat. No. 8,567,929, which is a continuation of application No. 12/753,448, filed on Apr. 2, 2010, now Pat. No. 8,403,466, said application No. 14/630,589 is a continuation-in-part of application No. 14/011,683, filed on Aug. 27, 2013, now Pat. No. 8,960,868, which is a continuation-in-part of application No. 13/352,290, filed on Jan. 17, 2012, now Pat. No. 8,517,524, which is a continuation-in-part of application No. 12/575,438, filed on Oct. 7, 2009, now Pat. No. 8,157,362, which is a continuation-in-part of application No. 12/363,572, filed on Jan. 30, 2009, now Pat. No. 8,096,630, which is a continuation-in-part of application No. 11/342,442, filed on Jan. 30, 2006, now abandoned.

(51) Int. Cl.

| | |
|---|---|
| ***G01D 11/00*** | (2006.01) |
| ***B41J 2/175*** | (2006.01) |
| ***B41J 2/21*** | (2006.01) |

(52) U.S. Cl.
CPC ... *B41J 2/175* (2013.01); *B41J 2/21* (2013.01)

(58) Field of Classification Search
CPC .... B41J 2/21; B41J 2/17553; Y10T 29/49401
USPC ...................... 347/43, 85, 86, 87, 20, 21, 100
See application file for complete search history.

(56) References Cited

U.S. PATENT DOCUMENTS

| | | | | |
|---|---|---|---|---|
| 5,549,740 | A * | 8/1996 | Takahashi et al. ......... | 106/31.43 |
| 5,680,162 | A | 10/1997 | Taylor et al. | |
| 5,984,450 | A | 11/1999 | Becker et al. | |
| 6,196,670 | B1 * | 3/2001 | Saruta ............................ | 347/86 |
| 6,328,405 | B1 | 12/2001 | Weber et al. | |
| 6,536,869 | B1 | 3/2003 | Bland et al. | |
| 6,984,014 | B2 | 1/2006 | Baiges | |
| 7,168,778 | B2 | 1/2007 | Baxter | |

(Continued)

*Primary Examiner* — Anh T. N. Vo

(74) *Attorney, Agent, or Firm* — Allen D. Hertz, P.A.; Allen D. Hertz

(57) ABSTRACT

A printing system comprising two or more groups of ink, wherein each group of ink includes ink based upon a unique formulation. This enables a user to select an ink type for printing an image without requiring extra printers or replacement of printing components. Additionally, the user can print a single image using inks of two different base formulations. The system comprises at least two groups of ink storage containers, each group containing a group of ink volumes, each group of ink volumes having a unique ink base formulation. The system further comprises at least two groups of ink formulation specific print heads, each group being associated with the compatible ink formulation. A controller enables the user to selectively print an image using ink having one or more ink base formulations. The system can use any configuration of ink storage configurations and print heads arrangements.

18 Claims, 11 Drawing Sheets

(56) References Cited

U.S. PATENT DOCUMENTS

| | | | | |
|---|---|---|---|---|
| 7,168,798 | B2 | 1/2007 | Samii et al. | |
| 7,393,073 | B2 | 7/2008 | Zach | |
| 7,399,071 | B2 | 7/2008 | Silverbrook et al. | |
| 7,429,101 | B2 * | 9/2008 | Petersen et al. | 347/85 |
| 7,543,924 | B2 | 6/2009 | Silverbrook | |
| 7,758,167 | B2 | 7/2010 | Silverbrook et al. | |
| 7,770,008 | B2 | 8/2010 | Walmsley | |
| 8,376,519 | B2 | 2/2013 | Silverbrook et al. | |
| 8,408,685 | B2 | 4/2013 | Delueg | |
| 8,567,939 | B2 | 10/2013 | Rosati et al. | |
| 8,651,640 | B2 * | 2/2014 | Hsueh et al. | 347/86 |
| 2004/0135859 | A1 | 7/2004 | German et al. | |
| 2011/0026058 | A1 | 2/2011 | Rosati et al. | |
| 2013/0201246 | A1 | 8/2013 | Belbeck | |

* cited by examiner

INK PRINTING SYSTEM COMPRISING GROUPS OF INKS, EACH GROUP HAVING A UNIQUE INKBASE COMPOSITION

CROSS REFERENCE TO RELATED APPLICATIONS

This application is:

a Continuation-In-Part patent application of U.S. patent application Ser. No. 14/011,683 filed on Aug. 27, 2013 (scheduled to issue as U.S. Pat. No. 8,960,868 on Feb. 24, 2015), which is a Continuation-In-Part patent application of U.S. patent application Ser. No. 13/851,067 filed on Mar. 26, 2013 (Issued as U.S. Pat. No. 8,567,929 on Oct. 29, 2013), which is a Continuing Prosecution patent application claiming the benefit of U.S. Non-Provisional patent application Ser. No. 12/753,448, filed on Apr. 2, 2010 (Issued as U.S. Pat. No. 8,403,466 on Mar. 26, 2013), and a Continuation-In-Part patent application of U.S. patent application Ser. No. 14/011,683 filed on Aug. 27, 2013 (scheduled to issue as U.S. Pat. No. 8,960,868 on Feb. 24, 2015), which is a Continuation-In-Part patent application of U.S. patent application Ser. No. 13/352,290 filed on Jan. 17, 2012 (Issued as U.S. Pat. No. 8,157,524 on Aug. 27, 2012), which is a Continuation-In-Part patent application of U.S. patent application Ser. No. 12/575,438 filed on Oct. 7, 2009 (Issued as U.S. Pat. No. 8,157,362 on Apr. 17, 2012), which is a Continuation-In-Part application claiming the benefit of U.S. patent application Ser. No. 12/363,572, filed Jan. 30, 2009 (issued as U.S. Pat. No. 8,096,630 on Jan. 17, 2012), which is a Continuation-In-Part application claiming the benefit of U.S. patent application Ser. No. 11/342,442, filed Jan. 30, 2006 (now abandoned), wherein the contents of each of the above identified applications/Patents are incorporated in their entireties herein by reference into the present application.

FIELD OF THE INVENTION

The present invention relates to the field of printing. In particular, the present invention relates to a printing system storing ink of two or more distinct base compositions and selectively dispensing ink from one of the two or more distinct base compositions. The printing system would typically be directed for use in Ink jet printers.

BACKGROUND OF THE INVENTION

Ink jet printers are a popular form of printer used with computers and similar applications involving document printing or graphics preparation. Typical ink jet printers, such as those manufactured by Original Equipment Manufacturers (OEMs) such as Hewlett Packard, have replaceable ink jet cartridges with built-in print heads. In alternative configurations, ink jet printers utilize replaceable ink storage reservoirs to provide a volume of ink to a print head for dispensing upon an object, such as paper, cardboard, planar media, and the like.

Inkjet print heads utilize very fine nozzles for projecting ink from an ink reservoir onto a printable substrate, such as a sheet of paper. The greater the print density, the finer or smaller the size of the nozzle apertures. The nozzles are designed for an ink having a specific base composition. The printer is configured to print the selected ink having the specific base composition.

Printers are configured to print using one or a series of ink colors, wherein the one or a series of ink colors are based upon one (1) specific base composition, with the only primary distinction being the color. In one configuration, the printer can be configured to print a single color, which is most commonly black. In a more common configuration, the printer is configured to print black and color images, wherein the majority of printers are configured to print using a series of colored ink including: Black ink, Magenta ink, Cyan ink, and Yellow ink.

The currently available printing system configurations are limited to printing using ink having a single base composition. This requires that a printing facility procure and maintain multiple printers, one for printing each specific ink composition. This requirement incurs significantly higher asset investments as well as high real estate requirements and associated costs. In an alternative, the user would have to replace the currently installed ink supply and dispensing components used for storing and designed to dispense ink from a first base composition to an ink supply and dispensing components used for storing and designed to dispense ink from a second base composition. This solution impacts cycle time, equipment downtime for replacement of the ink reservoirs and/or print heads, cleaning of the equipment, and the like.

This process is complicated further when the printing process requires depositing or printing ink from two different base compositions. In this scenario, the printing process must include a step of registering the indicia initially printed using the first composition based ink prior to printing or depositing the second composition based ink. The registration process introduces a time limitation, an equipment capability limitation, and an increased risk of misprinted final material.

Thus, there presently exists a need for providing ink having a minimized size and volume of particulate matter and minimizing entrapped air prior to and/or during an ink cartridge filling process.

BRIEF SUMMARY OF THE INVENTION

The present invention provides a printing system capable of dispensing ink having two or more base compositions. The system includes a first ink storage configuration dedicated for storage of ink based upon a first base composition ink and a second ink storage configuration dedicated for storage of ink based upon a second base composition ink. The system further includes a first print head adapted for printing the first base composition ink and a second print head adapted for printing the second base composition ink.

A first exemplary configuration would employ multiple series of ink reservoirs and associated ink print heads all integrated into a single cartridge. One series would comprise a first set of ink colors having a first base composition and an associated ink print head or heads. A second series would comprise a second set of ink colors having a second base composition and a second associated ink print head or heads. The ink can be configured for black printing only or black and color printing. The system would be user selectable from a print configuration/options window.

A second exemplary configuration would employ multiple ink cartridges, each ink cartridge comprising a complete printing arrangement storing and dispensing a unique ink formulation. The printer would be programmable for defining and selecting the ink formulation of each installed print cartridge. The printer can be adapted to employ multiple ink cartridges with the same ink formulation or each ink cartridge having a unique ink formulation.

A third exemplary configuration would employ multiple series of ink reservoirs in fluid communication with a print head using a flexible conduit. Ink would be transferred from the reservoir to the print head by a pump. Each series of reservoirs is in fluid communication with a respective print head. The ink can be configured for black printing only or black and color printing. The system would be user selectable from a print configuration/options window. Each of the print heads would be installed into a single print carriage.

A fourth exemplary configuration would employ multiple series of ink reservoirs in fluid communication with a print head using a flexible conduit. Ink would be transferred from the reservoir to the print head by a pump. Each series of reservoirs is in fluid communication with a respective print head. The ink can be configured for black printing only or black and color printing. The system would be user selectable from a print configuration/options window. Each of the print heads would be installed into its own unique print carriage.

In one aspect, the present invention is directed towards a printing system, the printing system comprising:

a plurality of ink storage containers and a plurality of print heads for printing an image using a group of ink having an ink base formulation selected from at least two groups of ink, each group of ink having a unique ink base formulation.

In a second aspect, the present invention is directed towards a printing system, the printing system comprising:

a plurality of ink storage containers, the plurality of ink storage containers segmented into at least two groups of ink storage containers, each group of ink storage containers containing a group of ink volumes, each group of ink volumes having a unique ink base formulation;

a plurality of print heads for printing an image, the print heads being segmented into at least two groups of ink formulation specific print heads, each group of ink formulation specific print heads being in fluid communication with the group of ink storage containers containing a group of ink volumes associated with a compatible ink formulation; and a controller, wherein the controller selects a desired ink base formulation for printing from one group of ink volumes, and wherein the printing system dispenses ink in accordance with the selected desired group of ink volumes from the group of ink storage containers associated with the selected desired ink base formulation, using the print head associated with the selected desired ink base formulation.

In another aspect, the present invention is directed towards a printing system, the printing system comprising:

a first ink storage configuration comprising at least one first formulated ink storage container, each of the at least one first formulated ink storage container containing a volume of ink having a composition based upon a first ink base formulation;

a first print head adapted for printing the first ink based upon the first ink base formulation, the first print head being in fluid communication with the first ink storage configuration;

a second ink storage configuration comprising at least one second formulated ink storage container, each of the at least one second formulated ink storage container containing a volume of ink having a composition based upon a second ink base formulation;

a second print head adapted for printing the second ink based upon the second ink base formulation; and a controller, wherein the controller selects a desired ink base formulation for printing from the first ink base formulation and the second ink base formulation, and wherein the printing system dispenses ink in accordance with the selected desired ink base formulation from the ink storage configuration associated with the selected desired ink base formulation, using the print head associated with the selected desired ink base formulation.

In another aspect, at least one first formulated ink storage container contains a volume of black ink having a composition based upon the first ink base formulation and at least one second formulated ink storage container contains a volume of first formulation black ink having a composition based upon the second ink base formulation.

In yet another aspect, at least one first formulation ink storage container contains a volume of first formulation colored ink having a composition based upon the first ink base formulation, wherein the first formulation colored ink is any color other than black and at least one second formulation ink storage container contains a volume of second formulation colored ink having a composition based upon the second ink base formulation, wherein the second formulation colored ink is any color other than black.

In yet another aspect, the first print head and the second print head are integrated into a single print cartridge.

In yet another aspect, the first ink storage configuration and the first print head are integrated into a single print cartridge.

In yet another aspect, the first ink storage configuration, the first print head, the second ink storage configuration, and the second print head are integrated into a single print cartridge.

In yet another aspect, the first ink storage configuration and the first print head are integrated into a first print cartridge and the second ink storage configuration and the second print head are integrated into a second print cartridge, wherein the first print cartridge and the second print cartridge are simultaneously installed into single printer.

In yet another aspect, the first ink storage configuration comprises at least two ink storage containers, a first of the four ink storage containers contains a volume of black ink having a composition based upon the first ink base formulation;

a second of the four ink storage containers contains a volume of colored ink having a composition based upon the first ink base formulation, wherein the colored ink is any color other than black.

In yet another aspect, the first ink storage configuration comprises at least two ink storage containers:

a first of the four ink storage containers of the first ink storage configuration contains a volume of black ink having a composition based upon the first ink base formulation; and a second of the four ink storage containers of the first ink storage configuration contains a volume of colored ink having a composition based upon the first ink base formulation, wherein the colored ink is any color other than black; and the second ink storage configuration comprises at least two ink storage containers:

a first of the four ink storage containers of the second ink storage configuration contains a volume of black ink having a composition based upon the second ink base formulation; and a second of the four ink storage containers of the second ink storage configuration contains a volume of colored ink having a composition based upon the second ink base formulation, wherein the colored ink is any color other than black.

In yet another aspect, the colored ink includes magenta, cyan, and yellow.

In yet another aspect, the first ink storage configuration comprises four ink storage containers, a first of the four ink storage containers contains a volume of black ink having a composition based upon the first ink base formulation;

a second of the four ink storage containers contains a volume of magenta ink having a composition based upon the first ink base formulation;

a third of the four ink storage containers contains a volume of cyan ink having a composition based upon the first ink base formulation; and a fourth of the four ink storage containers contains a volume of yellow ink having a composition based upon the first ink base formulation.

In yet another aspect, the first print head is installed into a printer carriage, wherein the printer carriage is moveably assembled within a printer.

In yet another aspect, the first print head and the second print head are installed into a printer carriage, wherein the printer carriage is moveably assembled within a printer.

In yet another aspect, the first print head is installed into a first printer carriage, wherein the first printer carriage is moveably assembled within a printer and the second print head is installed into a second printer carriage, wherein the second printer carriage is moveably assembled within a printer, wherein the first printer carriage and the second printer carriage are independently controlled and move independent of one another.

In yet another aspect, the plurality of ink storage containers comprises:

at least one ink storage container storing black ink having a first ink base formulation; and at least one ink storage container storing black ink having a second ink base formulation.

In yet another aspect, the plurality of ink storage containers further comprises:

at least one ink storage container storing a color ink having a first ink base formulation, wherein the color is a color other than black; and at least one ink storage container storing a color ink having a second ink base formulation, wherein the color is a color other than black.

In yet another aspect, the plurality of ink storage containers comprises:

at least one ink storage container storing a color ink having a first ink base formulation, wherein the color is a color other than black; and at least one ink storage container storing a color ink having a second ink base formulation, wherein the color is a color other than black.

In yet another aspect, the ink printing system further comprises:

at least one cartridge, each of the at least one cartridge comprising:

at least one ink storage container of the plurality of ink storage containers, each at least one ink storage container containing a volume of ink, and at least one print head of the plurality of print heads, wherein each of the at least one print head is in fluid communication with an associated ink storage container of the plurality of ink storage containers, the associated ink storage container containing a volume of associated ink having an associated ink base formulation, and the associated print head being compatible with the associated ink formulation.

In yet another aspect, the ink printing system further comprises:

at least one print head subassembly, wherein the at least one print head subassembly carries at least one print head of the plurality of print heads, each of the at least one print head subassembly is carried by a positioning control system and move during use, wherein the plurality of ink storage containers are configured as remote ink reservoirs, wherein each remote ink reservoir is detachable assembled to an associated print head subassembly of the at least one print head subassembly and in fluid communication with each associated print head of the plurality of print heads.

In yet another aspect, the plurality of ink storage containers comprises:

at least one remote ink reservoir, wherein the at least one remote ink reservoir is maintained in a fixed position; and the plurality of print heads are carried by a positioning control system and move during use.

In yet another aspect, each group of ink formulation specific print heads of the at least two groups of ink formulation specific print heads is carried by an associated positioning control system, wherein each group of ink formulation specific print heads moves independent of the other groups of ink formulation specific print heads during use.

In yet another aspect, the first ink base formulation of the group of ink volumes is a second ink base formulation selected from an ink base formulation group, wherein the ink base formulation group consists of: an aqueous based ink formulation, a solvent based ink formulation, an ultra-violet (UV) curable based ink formulation, and a dye sublimation based ink formulation; and a second ink base formulation of the group of ink volumes is a second ink base formulation selected from the ink base formulation group, wherein the first ink base formulation and the second ink base formulation differ from one another.

In yet another aspect, the ink printing system is expanding, including:

a printer comprising:

at least one print cartridge printing controller carriage moveably assembled therein, wherein the at least one print cartridge printing controller carriage moves along a first direction, and a target object feed system adapted to move a target object in a second direction, wherein the first direction and the second direction are generally perpendicular to one another;

a plurality of ink storage containers, the plurality of ink storage containers segmented into at least two groups of ink storage containers, each group of ink storage containers containing a group of ink volumes, each group of ink volumes having a unique ink base formulation; and a plurality of print heads for printing an image, the print heads being segmented into at least two groups of ink formulation specific print heads, each group of ink formulation specific print heads being in fluid communication with the group of ink storage containers containing a group of ink volumes associated with a compatible ink formulation;

wherein the plurality of print heads are carried by the at least one print cartridge printing controller carriage.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. In other implementations, well-known features and methods have not been described in detail so as not to obscure the invention. For purposes of description herein, the terms "upper", "lower", "left", "right", "front", "back", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments that may be disclosed herein are not to be considered as limiting, unless the claims expressly state otherwise.

Figure 1:
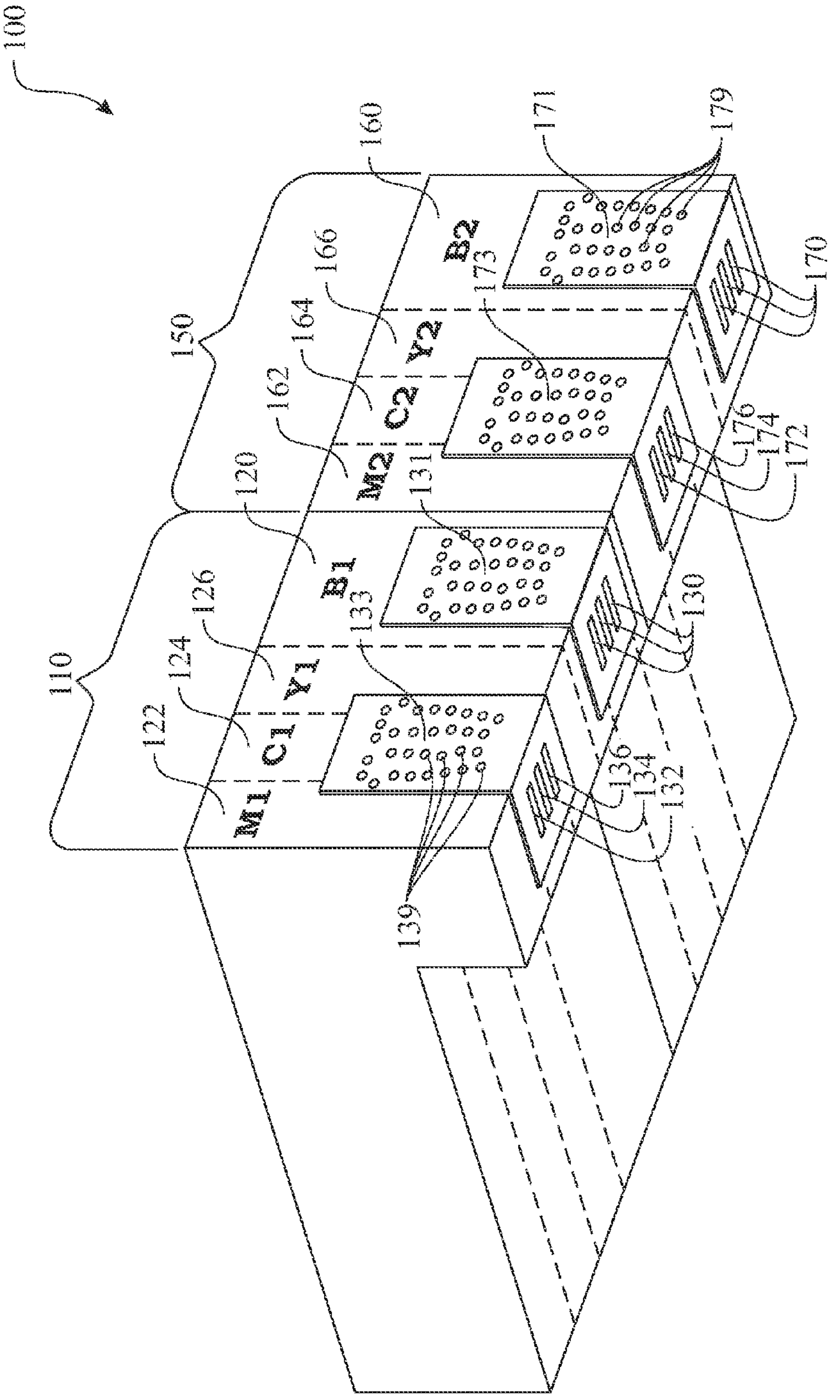
FIG. 1 presents an isometric view of an exemplary printing system, the printing system comprising a plurality of ink storage containers and a plurality of print heads for printing an image using a group of ink having an ink base formulation selected from at least two groups of ink, each group of ink having a unique ink base formulation.
Figure 2:
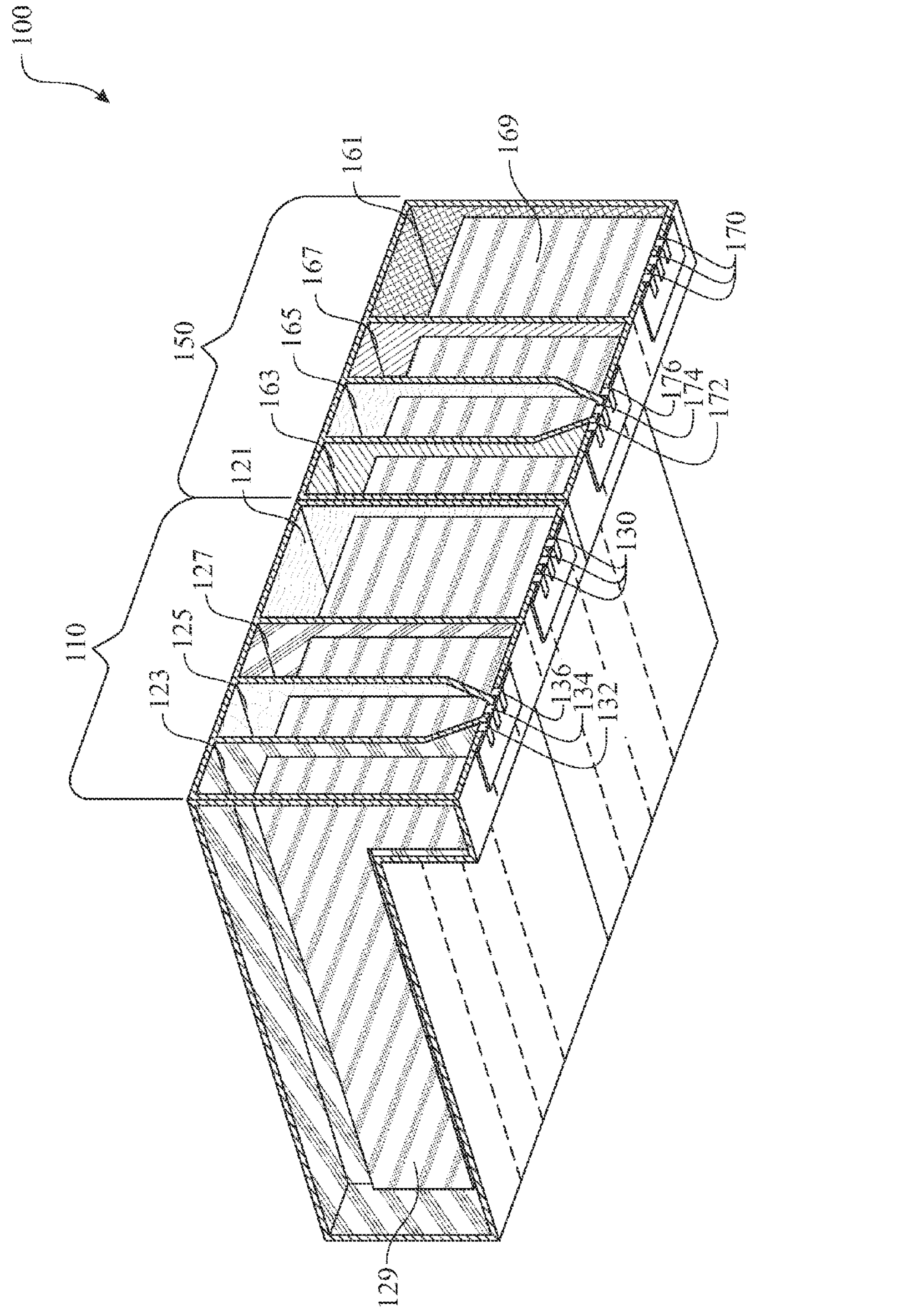
FIG. 2 presents a sectioned view of the exemplary printing system introduced in FIG. 1.

A multi-base formulation ink printer cartridge 100, as illustrate in FIGS. 1 and 2, enables a user to select between two or more ink base formulations for printing an image onto an object. The exemplary multi-base formulation ink printer cartridge 100 is illustrated having two groups of ink, each group having a unique ink base formulation. It is understood that the elements associated with each group can be replicated to introduce additional ink base formulations into the multi-base formulation ink printer cartridge 100, thus providing three or more groups.

The ink base formulations can be selected from aqueous (water) based ink formulations, solvent based ink formulations, ultra-violet (UV) curable based ink formulations, dye sublimation based ink formulations, and the like. Aqueous inks are based on a mixture of water, glycol and dyes or pigments. These inks are inexpensive to manufacture, but are difficult to control on the surface of media, often requiring specially coated media. Some ink manufactures use ink containing sulfonated polyazo black dye, nitrates and other compounds. Aqueous inks are mainly used in printers with thermal inkjet heads, as these heads require water to perform.

The main ingredient of solvent inks are volatile organic compounds (VOCs), organic chemical compounds that have high vapor pressures. Color is achieved with pigments rather than dyes for excellent fade-resistance. The chief advantage of solvent inks is that they are comparatively inexpensive and enable printing on flexible, uncoated vinyl substrates, which are used to produce vehicle graphics, billboards, banners and adhesive decals. Disadvantages of the solvent inks include the vapour produced by the solvent and the need to dispose of used solvent. Unlike most aqueous inks, prints made using solvent-based inks are generally waterproof and ultraviolet-resistant (for outdoor use) without special over-coatings. The high print speed of many solvent printers demands special drying equipment, usually a combination of heaters and blowers. The substrate is usually heated immediately before and after the print heads apply ink. Solvent inks are divided into two sub-categories: hard solvent ink offers the greatest durability without specialized over-coatings but requires specialized ventilation of the printing area to avoid exposure to hazardous fumes, while mild or "eco" solvent inks, while still not as safe as aqueous inks, are intended for use in enclosed spaces without specialized ventilation of the printing area. Mild solvent inks have rapidly gained popularity in recent years as their color quality and durability have increased while ink cost has dropped significantly.

Ultra-violet (UV) curable based ink formulations consist mainly of acrylic monomers with an initiator package. After printing, the ink is cured by exposure to strong UV-light. Ink is exposed to UV radiation where a chemical reaction takes place where the photo-initiators cause the ink components to cross-link into a solid. Typically a shuttered mercury-vapor lamp is on either side of the print head, and produces a great amount of heat to complete the curing process (this lamp is used for free radical UV ink, which is what the majority of flatbed inkjet systems use). UV inks do not evaporate, but rather cure or set as a result from this chemical reaction. No material is evaporated or removed, which means about 100% of the delivered volume is used to provide coloration. This reaction happens very quickly, which leads to instant drying that results in a completely cured graphic in a matter of seconds. This also allows for a very fast print process. As a result of this instant chemical reaction no solvents penetrate the substrate once it comes off the printer, which allows for high quality prints. The advantage of UV-curable inks is that they "dry" as soon as they are cured, they can be applied to a wide range of uncoated substrates, and they produce a very robust image. Disadvantages are that they are expensive, require expensive curing modules in the printer, and the cured ink has a significant volume and so gives a slight relief on the surface. Though improvements are being made in the technology, UV-curable inks, because of their volume, are somewhat susceptible to cracking if applied to a flexible substrate. As such, they are often used in large "flatbed" printers, which print directly to rigid substrates such as plastic, wood or Aluminum where flexibility is not a concern.

Dye sublimation based ink formulations contain special sublimation dyes and are used to print directly or indirectly on to fabrics which consist of a high percentage of polyester fibers. A heating step causes the dyes to sublimate into the fibers and create an image with strong color and good durability.

The multi-base formulation ink printer cartridge 100 is segmented into a first ink base formulation section 110 and a second ink base formulation section 150. Like elements of the first ink base formulation section 110 and second ink base formulation section 150 are identified by reference numerals that are incremented by 40. Each exemplary ink base formulation sections 110, 150 include one (1) black, first ink base formulation subsection 120 and three colored, first ink base formulation subsections 122, 124, 126. The exemplary black, first ink base formulation subsection 120 is referenced as storing and printing black ink (121) having a first ink base formulation. The exemplary three (3) colored, first ink base formulation subsections 122, 124, 126 are referenced as storing and printing magenta ink (123) having a first ink base formulation, cyan ink (125) having a first ink base formulation, and yellow ink (127) having a first ink base formulation. Although the exemplary embodiment includes one (1) black, first ink base formulation subsection 120 and three (3) colored, first ink base formulation subsections 122, 124, 126, it is understood that the present invention is not limited to this combination. The first ink base formulation section 110 can omit the black, first ink base formulation subsection 120, providing a colored-ink only solution or include any reasonable number of black, first ink base formulation subsections 120 to increase a print quality and/or speed. Similarly, the first ink base formulation section 110 can omit the colored, first ink base formulation subsections 122, 124, 126, providing a black only printing solution, or include any number of colored, first ink base formulation subsections 122, 124, 126. The colored, first ink base formulation subsections 122, 124, 126 can store and print any suitable colored ink combinations having a first ink base formulation, with the magenta ink (123) having a first ink base formulation, cyan ink (125) having a first ink base formulation, and yellow ink (127) having a first ink base formulation only being exemplary.

The black, first ink base formulation 121 is stored within the black, first ink base formulation subsection 120. The black, first ink base formulation subsection 120 can include any desired ink storage element or elements, such as an ink sponge 129, 169 (as illustrated), a bag, or any other suitable ink storage element.

Referencing the first ink base formulation section 110 as an example, each ink reservoir, 120, 122, 124, 126 would be in fluid communication with a respective print head 130, 132, 134, 136. The respective print head 130, 132, 134, 136 would be designed to ensure and optimize compatibility with the selected ink base formulation 121, 123, 125, 127. The printer and/or associated print head 130, 132, 134, 136 would additionally include any other necessary equipment to support the selected ink base formulations for each group of inks within the multi-base formulation ink printer cartridge 100.

Similarly, referencing the second ink base formulation section 150 as a second example, each ink reservoir, 160, 162, 164, 166 would be in fluid communication with a respective print head 170, 172, 174, 176. The exemplary black, second ink base formulation subsection 160 is referenced as storing and printing black ink (161) having a second ink base formulation. The exemplary three (3) colored, second ink base formulation subsections 162, 164, 166 are referenced as storing and printing magenta ink (163) having a second ink base formulation, cyan ink (165) having a second ink base formulation, and yellow ink (167) having a second ink base formulation. Although the exemplary embodiment includes one (1) black, second ink base formulation subsection 160 and three (3) colored, second ink base formulation subsections 162, 164, 166, it is understood that the present invention is not limited to this combination.

The respective print head 170, 172, 174, 176 would be designed to ensure and optimize compatibility with the selected ink base formulation 161, 163, 165, 167. The printer and/or associated print head 170, 172, 174, 176 would additionally include any other necessary equipment to support the selected ink base formulations for each group of inks within the multi-base formulation ink printer cartridge 100.

A black, first ink base formulation print head controller circuit 131 provides a printing function for the black, first ink base formulation subsection 120. The black, first ink base formulation print head controller circuit 131 is integral with the black, first ink base formulation subsection 120, wherein the black, first ink base formulation print head controller circuit 131 provides the necessary elements for obtaining ink from the ink storage container of the black, first ink base formulation subsection 120 and dispenses the black, first ink base formulation 121 onto the target object in accordance with an image pattern. The black, first ink base formulation print head controller circuit 131 includes circuitry, a series of first ink based formulation ink print head controller circuit contacts 139, wherein each contact 139 is in signal communication with the circuitry, a black, first ink base formulation print head ink applicator 130 (including ink dispensing orifices designed for compatibility with the first ink base formulation), and other known elements for printing ink onto the target object. The black, first ink base formulation print head ink applicator 130 and associated circuitry is designed to be compatible with the specific ink base formulation of the black, first ink base formulation 121.

Similarly, a black, second ink base formulation print head controller circuit 171 provides the printing function for the black, second ink base formulation subsection 160. Signals would be provided to the second ink base formulation print head controller circuit 171 through a series of second ink based formulation ink print head controller circuit contacts

179. The black, second ink base formulation 161 would be printed using the black, second ink base formulation print head ink applicator 170.

Additionally, a color print head controller circuit 133 provides a printing function for the colored ink sections, 122, 124, 126. The color print head controller circuit 133 is integral with the colored ink sections, 122, 124, 126, wherein the color print head controller circuit 133 provides the necessary elements for obtaining ink from the ink storage container of the colored ink sections, 122, 124, 126 and dispenses the first-colored, first ink base formulation 123, the second-colored, first ink base formulation 125, and the third-colored, first ink base formulation 127 onto the target object in accordance with colors associated with the image pattern. The color print head controller circuit 133 includes circuitry, a series of first ink based formulation ink print head controller circuit contacts 139, wherein each contact 139 is in signal communication with the circuitry, a first-colored ink, first ink base formulation print head ink applicator 132 (including ink dispensing orifices designed for compatibility with the first ink base formulation) for dispensing the first-colored, first ink base formulation 123, a second-colored ink, first ink base formulation print head ink applicator 134 (including ink dispensing orifices designed for compatibility with the first ink base formulation) for dispensing the second-colored, first ink base formulation 125, a third-colored ink, first ink base formulation print head ink applicator 136 (including ink dispensing orifices designed for compatibility with the first ink base formulation) for dispensing the third-colored, first ink base formulation 127, and other known elements for printing ink onto the target object. The ink applicators 132, 134, 136 and associated circuitry is designed to be compatible with the specific ink base formulation of the black, first ink base formulation 121.

Similarly, a color, second ink base formulation print head controller circuit 173 provides the printing function for the three, colored, second ink base formulation subsections 162, 164, 166. Signals would be provided to the color, second ink base formulation print head controller circuit 173 through a series of second ink based formulation ink print head controller circuit contacts 179. The colored (non-black), second ink base formulations 163, 165, 167 would be printed using the color, second ink base formulation print head ink applicators 172, 174, 176.

In operation, the user would select which ink based formulation or combination of ink based formulations are desired for printing. In a condition where the user selects one specific ink based formulation, a controller would selectively operate the ink base formulation section 110, 150 associated with the selected ink based formulation, directing the associated ink base formulation section 110, 150 to print the desired image using ink having the desired ink base formulation. This can be an image printed using only black ink, an image printed using only a single colored ink, an image printed using multiple colored inks, an image using black ink and a single colored ink, an image using black ink and multiple colored inks, and the like.

A print file or printer instructions would be provided in a proper format to a printer. The printer would interpret the print file or printer instructions and formulate the appropriate signal pattern for driving the print head(s) 130, 132, 134, 136 and/or print head(s) 170, 172, 174, 176. Details of the printing process are well known by those skilled in the art, wherein the ink formulation selection process would be introduced as a new feature into a commonly known printing process and the associated printing algorithms.

Figure 3:
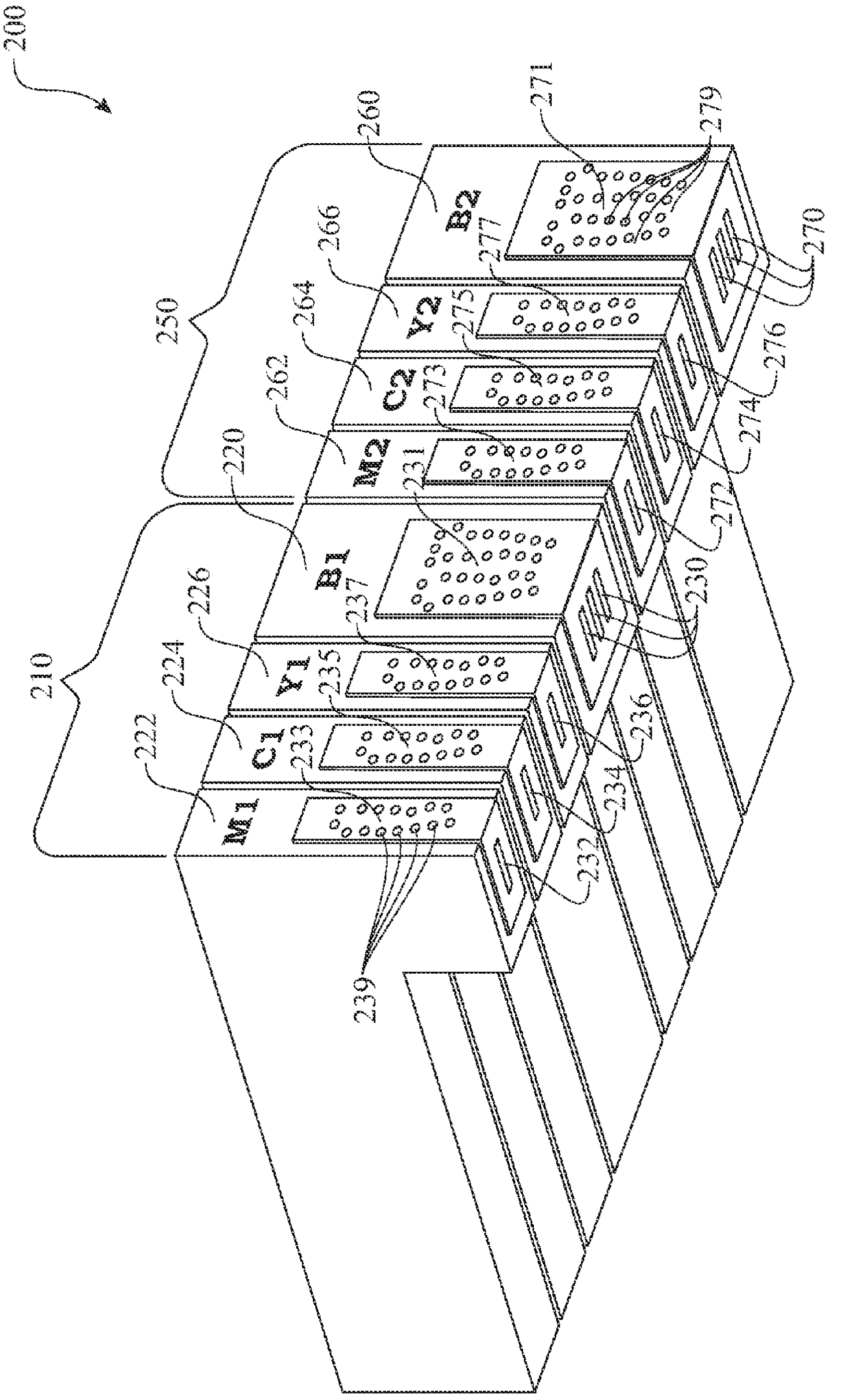
FIG. 3 presents an isometric view of a second exemplary printing system, the printing system comprising at least two groups of print cartridges, each print cartridge comprising an ink storage container and an associated print head, each group of ink having a unique ink base formulation.
Figure 4:
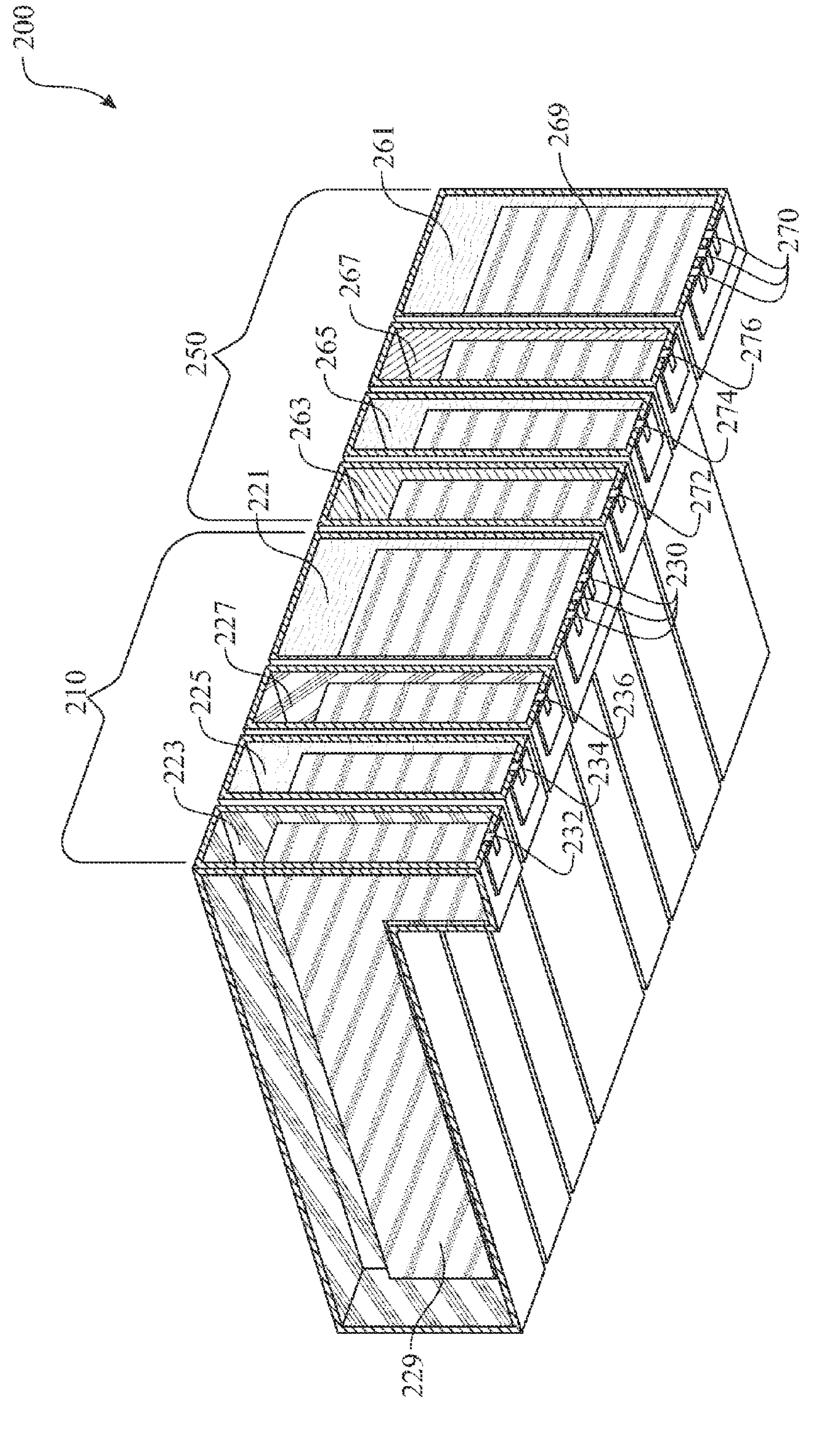
FIG. 4 presents a sectioned view of the exemplary printing system introduced in FIG. 3.

In one variant, the concept can be applied to a series of individual cartridges, as presented in the exemplary multi-base formulation ink printer cartridge system 200 illustrated in FIGS. 3 and 4. The multi-base formulation ink printer cartridge system 200 is similar to the multi-base formulation ink printer cartridge 100 described above. Like features of the multi-base formulation ink printer cartridge 100 and the multi-base formulation ink printer cartridge system 200 are numbered the same, except being preceded by the number "2". The multi-base formulation ink printer cartridge 100 integrates the first ink base formulation subsections 120, 122, 124, 126 into one first ink base formulation section 110, and the second ink base formulation subsections 160, 162, 164, 166 into one second ink base formulation section 150; whereas the multi-base formulation ink printer cartridge system 200 is configured as a first ink base group 210 comprising of individual first ink base cartridges 220, 222, 224, 226 and a second ink base group 250 comprising of individual second ink base cartridges 260, 262, 264, 266. Each of the individual first ink base cartridges 220, 222, 224, 226 and the individual second ink base cartridges 260, 262, 264, 266 would be simultaneously inserted into a single printing cartridge for use in a multi-ink group printer.

In the configuration represented by the multi-base formulation ink printer cartridge system 200, each first ink base formulation cartridge 220, 222, 224, 226 would include a respective first ink base formulation print head controller circuit 231, 233, 235, 237 and each second ink base formulation cartridge 260, 262, 264, 266 would include a respective second ink base formulation print head controller circuit 271, 273, 275, 277. Each first ink base formulation head controller circuit 231, 233, 235, 237 includes an associated series of print head controller circuit contacts 239 and each second ink base formulation head controller circuit 271, 273, 275, 277 includes an associated series of print head controller circuit contacts 279. Each head controller circuit 231, 233, 235, 237, 271, 273, 275, 277 would direct dispensing of ink through an associated print head 230, 232, 234, 236, 270, 272, 274, 276.

The distinction between the multi-base formulation ink printer cartridge 100 and the multi-base formulation ink printer cartridge system 200 is the ability to individually replace any color of ink of any ink base formulation. In the multi-base formulation ink printer cartridge 100, the entire ink base formulation section 110, 150 would need to be replaced upon depletion of a single color within the section 110, 150. Conversely, as any volume of ink 221, 223, 225, 227 within any of the first ink base formulation cartridges 220, 222, 224, 226 becomes depleted, the individual cartridge that is depleted of ink would be replaced with a filled like-color replacement first ink base formulation cartridge 220, 222, 224, 226. Similarly, as any volume of ink 261, 263, 265, 267 within any of the second ink base formulation cartridges 260, 262, 264, 266 becomes depleted, the individual cartridge that is depleted of ink would be replaced with a filled like-color replacement second ink base formulation cartridge 260, 262, 264, 266. Upon replacement, the multi-base formulation ink printer cartridge system 200 can optionally complete a print head alignment process. Since each cartridge 220, 222, 224, 226, 260, 262, 264, 266 includes an associated head controller circuit 231, 233, 235, 237, 271, 273, 275, 277 and the respective print head 230, 232, 234, 236, 270, 272, 274, 276, the cost of each cartridge 220, 222, 224, 226, 260, 262, 264, 266 may be slightly higher. The advantage of this configuration is the ability to maximize the use of each specific ink 221, 223, 225, 227, 261, 263, 265, 267.

Operation of the multi-base formulation ink printer cartridge system 200 would be similar to the operation of the multi-base formulation ink printer cartridge 100 as previously described. The one distinction is the separation of the non-black colored first ink based formulation print head controllers 233, 235, 237 and associated non-black colored first ink based formulation print heads 232, 234, 236 as well as the separation of the non-black colored second ink based formulation print head controllers 273, 275, 277 and associated non-black colored second ink based formulation print heads 272, 274, 276.

Figure 5:
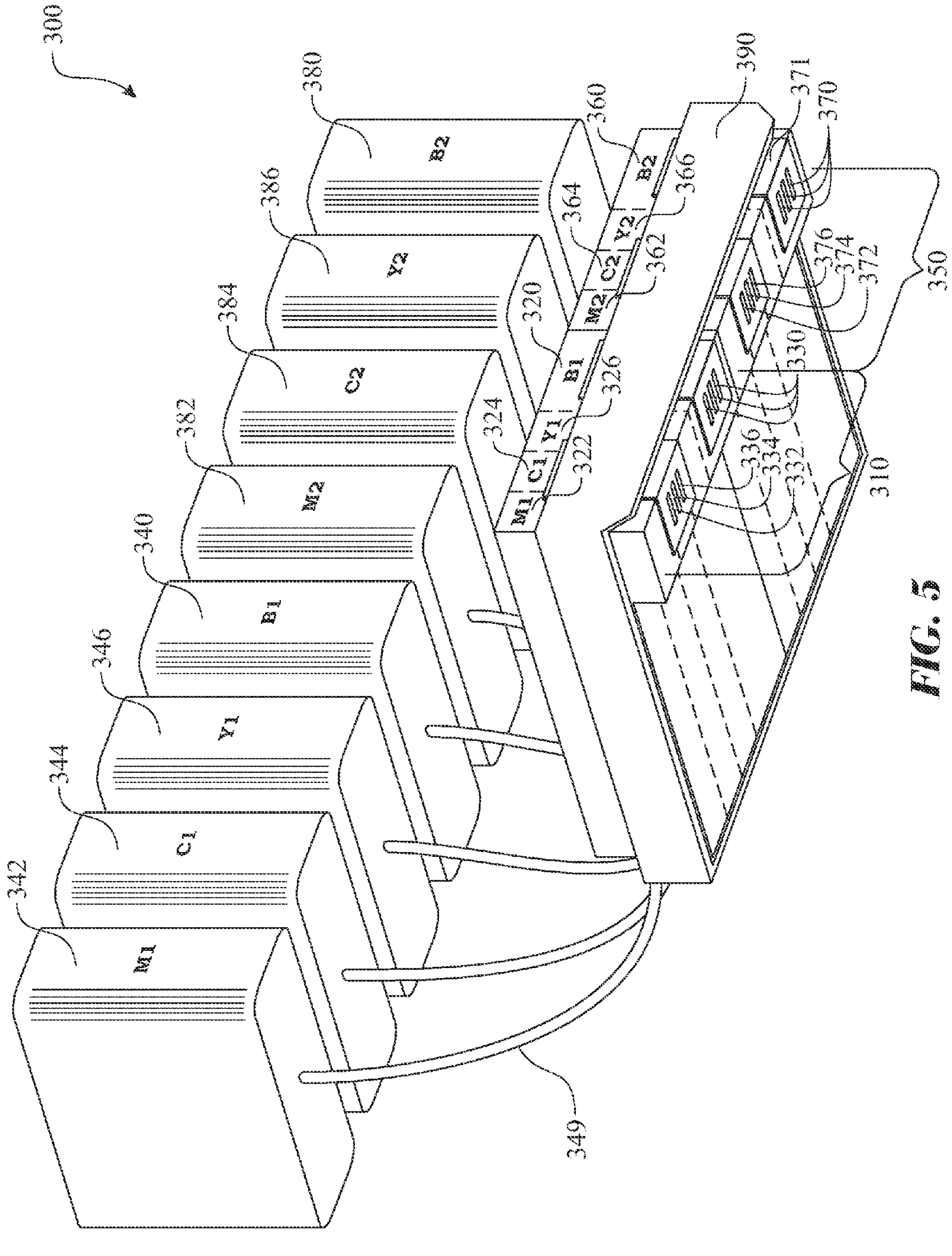
FIG. 5 presents an isometric view of a third exemplary printing system, the printing system comprising a plurality of remotely located, fixed ink storage containers and a plurality of carriage supported print heads for printing an image using a group of ink having an ink base formulation selected from at least two groups of ink, each group of ink having a unique ink base formulation.
Figure 6:
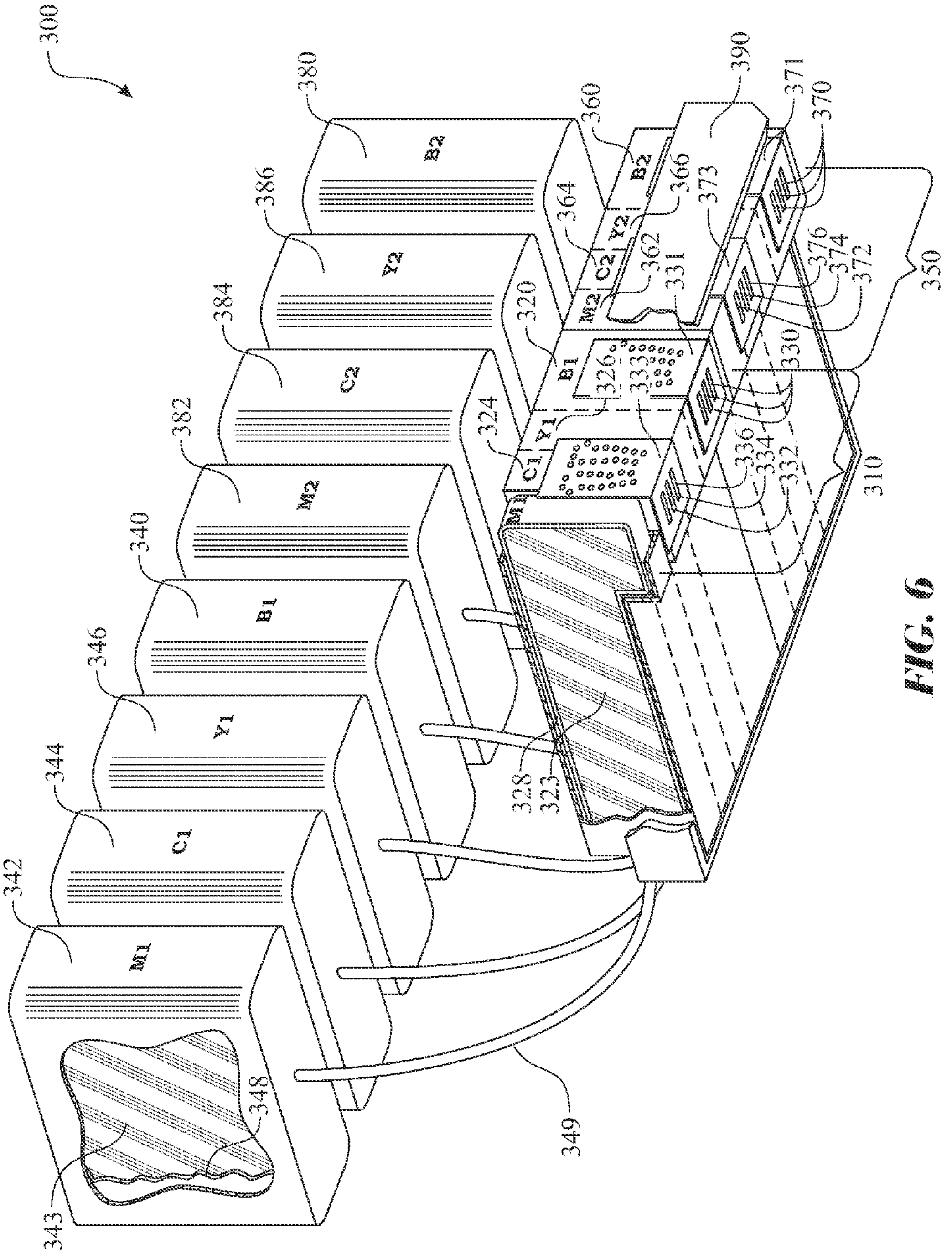
FIG. 6 presents a sectioned view of the exemplary printing system introduced in FIG. 5.

In another variant, the concept is a modified version of the multi-base formulation ink printer cartridge 100, wherein volumes of ink based upon a first ink base formulation are stored remotely in first ink base formulation remote reservoirs 340, 342, 344, 346 and volumes of ink based upon a second ink base formulation are stored remotely in second ink base formulation remote reservoirs 380, 382, 384, 386, as presented in the exemplary multi-base formulation ink printer cartridge 300 illustrated in FIGS. 5 and 6. Like features of the multi-base formulation ink printer cartridge 100 and the multi-base formulation ink printer cartridge 300 are numbered the same, except being preceded by the number "3". In the multi-base formulation ink printer cartridge 100, each first ink base formulation subsections 120, 122, 124, 126 solely contains each respective ink 121, 123, 125, 127, and similarly, each second ink base formulation subsections 160, 162, 164, 166 solely contains each respective second ink base formulation ink 161, 163, 165, 167.

In the multi-base formulation ink printer cartridge 300, the primary volume of ink is stored remotely in an associated remote reservoir and a much smaller volume of the same ink is stored within a storage element contained within an ink storage element provided within the associated first ink base formulation print head ink volume supply subsection 320, 322, 324, 326 and the second ink base formulation print head ink volume supply subsection 360, 362, 364, 366. It is noted that the ink storage element can be a sponge within a fluid tight container (as described above), a first ink base formulation print head ink storage bag 328 (as shown in the exemplary illustration), or any other suitable ink storage element.

In the exemplary cutaway section illustrated in FIG. 6, a volume of first-colored, first ink base formulation 343 is stored within a first ink base formulation remote reservoir ink storage bag 348 located within an interior of the first-colored, first ink base formulation remote reservoir 342. Similarly, a smaller volume of first-colored, first ink base formulation 323 is stored within a first ink base formulation print head ink storage bag 328 located within an interior of the first-colored, first ink base formulation print head ink volume supply subsection 322. A remote reservoir to print head ink transfer conduit 349 provides fluid communication between the first ink base formulation remote reservoir ink storage bag 348 and the first ink base formulation print head ink storage bag 328. A pump (not shown, but well understood by description) can be included between the first ink base formulation remote reservoir ink storage bag 348 and the first ink base formulation print head ink storage bag 328 to control a transfer of ink from the first ink base formulation remote reservoir ink storage bag 348 to the first ink base formulation print head ink storage bag 328.

Figure 7:
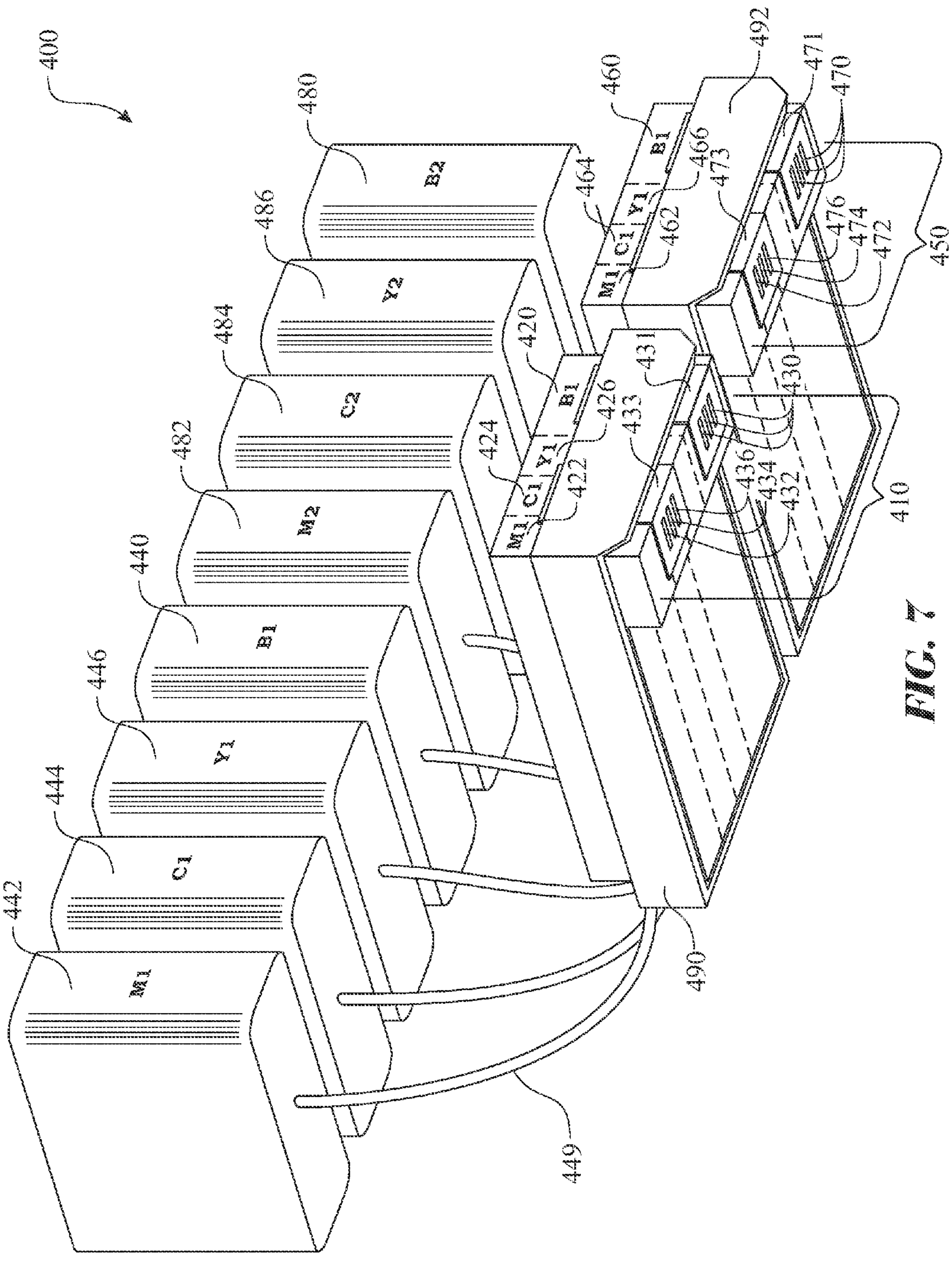
FIG. 7 presents an isometric view of a fourth exemplary printing system, the printing system comprising at least two print carriages, each print carriage being associated with a group of ink having an associated ink base formulation, the printing system comprising at least two groups of ink, each group of ink having a unique ink base formulation.
Figure 8:
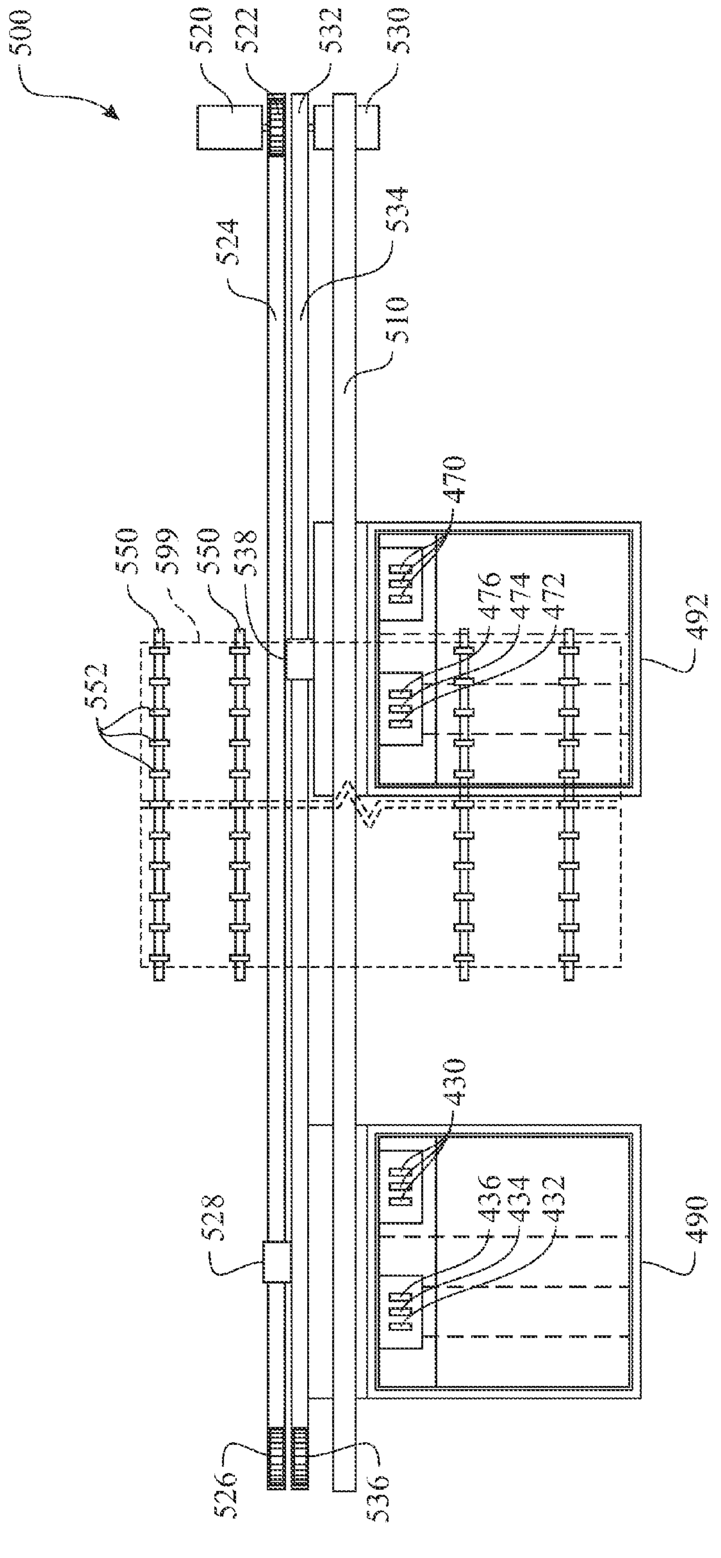
FIG. 8 presents a bottom plan view of a printer operating subassembly comprising the exemplary printing system introduced in FIG. 7.
Figure 9:
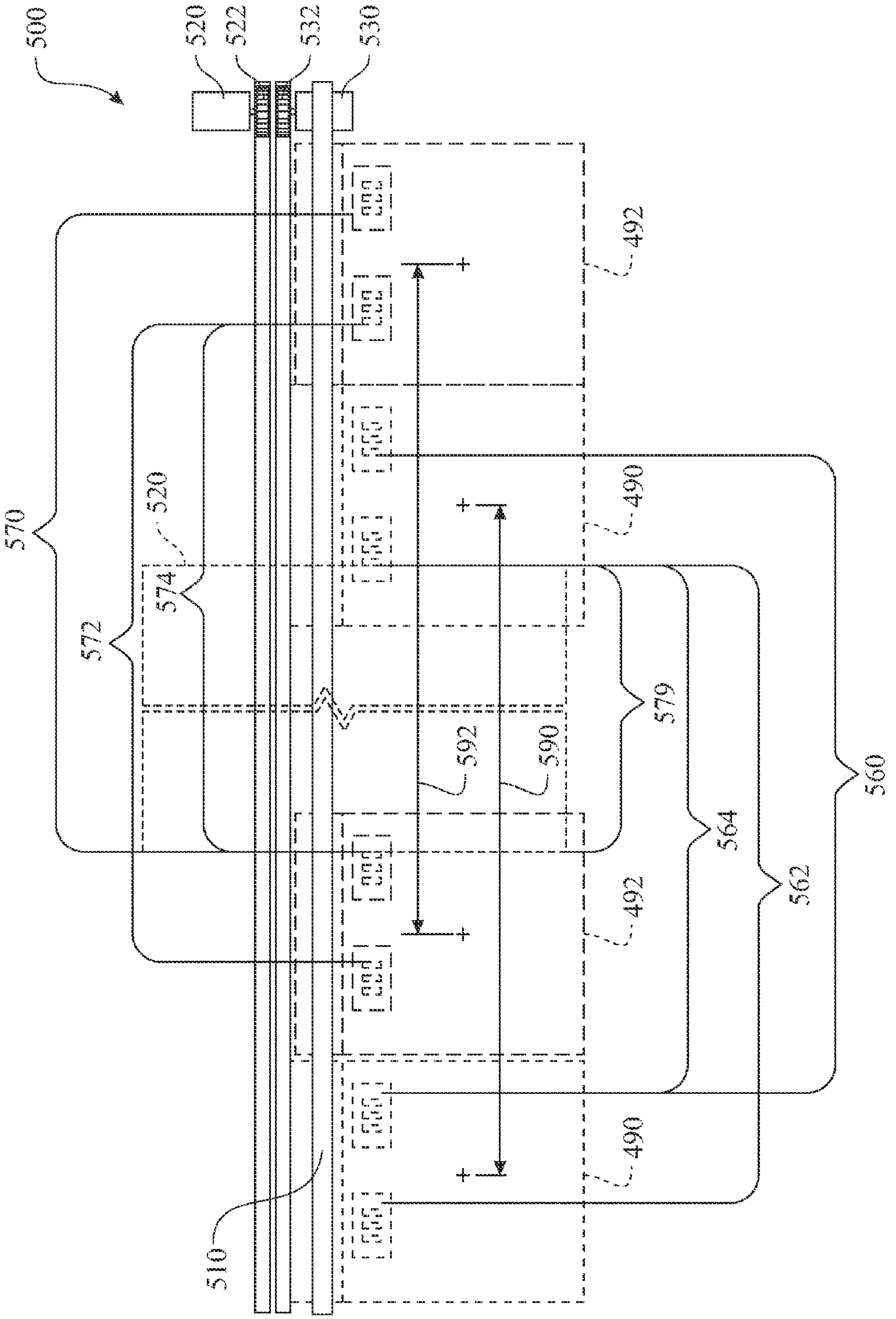
FIG. 9 presents a bottom plan view of the printer operating subassembly introduced in FIG. 8, the illustration detailing operational movements and useable area of the printer operating subassembly.

The first ink base formulation section 310 and second ink base formulation section 350 can be fabricated as a unitary structure, separate subassemblies that are joined to one another, or separate subassemblies. The first ink base formulation section 310 and second ink base formulation section 350 can be inserted into a single print cartridge printing controller carriage 390 as illustrated in FIGS. 5 and 6 or into individual carriages, such as those shown in the exemplary illustrations utilizing a first ink composition print cartridge printing controller carriage 490 and a second ink composition print cartridge printing controller carriage 492 as illustrated in FIGS. 7 through 9. By including the remote reservoirs 340, 342, 344, 346, 380, 382, 384, 386, the multi-base formulation ink printer cartridge 300 can store large volumes of ink without impacting the printing process, speed, or quality. The inclusion of remote reservoirs 340, 342, 344, 346, 380, 382, 384, 386 reduces the volume of ink carried by each print head ink volume supply subsection 320, 322, 324, 326, 360, 362, 364, 366, thus reducing the carried weight of the associated ink. This reduces inertial forces induced during acceleration and de-acceleration of the print cartridge printing controller carriage 390 during the printing process, while maintaining or even increasing a total printing capacity.

A quick connect or similar functioning device can be inserted between each remote reservoir 340, 342, 344, 346, 380, 382, 384, 386 and the associated remote reservoir to print head ink transfer conduit 349. Each connector portion of the quick connect can include a valve to control loss of ink from the connector portion when the each remote reservoir 340, 342, 344, 346, 380, 382, 384, 386 is disconnected from the associated remote reservoir to print head ink transfer conduit 349 and removed from the printer or other seating location. This enables a expeditious and virtually effortless replacement of each remote reservoir 340, 342, 344, 346, 380, 382, 384, 386 upon depletion of the supplied volume of ink therein.

Another benefit of the configuration including remote reservoirs 340, 342, 344, 346, 380, 382, 384, 386 is a reduction in size of each associated print head ink volume supply subsection 320, 322, 324, 326, 360, 362, 364, 366. The reduction in size, reduces material costs, weight, and spacing, more specifically the dimensionally induced limitations for sizing of the printer. the impact of the size of each associated print head ink volume supply subsection 320, 322, 324, 326, 360, 362, 364, 366 is illustrated in FIG. 8 and will be discussed later herein.

In one variant, the remote reservoirs 340, 342, 344, 346, 380, 382, 384, 386 can be mounted or maintained in a fixed position. In another variant, the remote reservoirs 340, 342, 344, 346, 380, 382, 384, 386 can be removably assembled to each associated ink base formulation subsection 320, 322, 324, 326, 360, 362, 364, 366.

Operation of the multi-base formulation ink printer cartridge 300 would be similar to the operation of the multi-base formulation ink printer cartridge 100 as previously described. The one distinction is the additional requirement for transferring ink from each remote reservoir 340, 342, 344, 346, 380, 382, 384, 386 to the associated print head ink volume supply subsection 320, 322, 324, 326, 360, 362, 364, 366. In preparation, the multi-base formulation ink printer cartridge 300 would direct a transfer of a volume of ink from each remote reservoir 340, 342, 344, 346, 380, 382, 384, 386 to the associated print head ink volume supply subsection 320, 322, 324, 326, 360, 362, 364, 366, thus storing a predetermined volume of ink in each print head ink volume supply subsection 320, 322, 324, 326, 360, 362, 364, 366. As mentioned above, positioning of the first ink base formulation section 310 and second ink base formulation section 350 is provided by moving the print cartridge printing controller carriage 390 laterally across a target object. The target object is moved longitudinally in a synchronized manner with the lateral motion of the print cartridge printing controller carriage 390. The ink is dispensed by the associated print heads 330, 332, 334, 336, 370, 372, 374, 376 in concert with the lateral motion of the print cartridge printing controller carriage 390 and the longitudinal motion of the target object.

In another variant, the concept is a modified version of the multi-base formulation ink printer cartridge 300, wherein a first ink base formulation cartridge 410 and a second ink base formulation cartridge 450 are carried by separate carriages 490, 492, as presented in the exemplary multi-base formulation ink printer cartridge system 400 illustrated in FIGS. 7 through 9. Like features of the multi-base formulation ink printer cartridge 300 and the multi-base formulation ink printer cartridge system 400 are numbered the same, except being preceded by the number "4". Separating the first ink base formulation cartridge 410 and the second ink base formulation cartridge 450 into separate carriages 490, 492, reduces weight of each carriage 410, 450, which affects the motion of the respective carriage 410, 450. The drawback is the requirement for replication of the movement components for moving each carriage 410, 450 independently. Each of the first ink base formulation cartridge 410 and the second ink base formulation cartridge 450 can be designed and manufactured as multi-colored print head assemblies (as shown) or as individual print head assemblies, each print head assembly being dedicated for a single color of ink. In another version, the print heads can be separated into a black print head assembly 420, 460 and a colored-ink (non-black) print head assembly (combining the first-colored, first ink base formulation subsection 422, the second-colored, first ink base formulation subsection 424, and the third-colored, first ink base formulation subsection 426 into a first ink based formulation colored-ink print head assembly and combining the first-colored, second ink base formulation subsection 462, the second-colored, second ink base formulation subsection 464, and the third-colored, second ink base formulation subsection 466 into a second ink based formulation colored-ink print head assembly). In yet another version, the print heads can be separated into pairs of colored ink, such as a print head assembly dedicated to print black and yellow ink and a second print head assembly dedicated to print magenta and cyan. In yet another version, each print head assembly can be designed to print like colors of inks having different ink base formulations. For example, the black, first ink base formulation subsection 420 and the black, second ink base formulation subsection 460 can be integrated into a single unit having two print heads 430, 470.

Details of functional components of a printer operating subassembly 500 are presented in an illustration shown in FIG. 8, and the movements and printing area are presented in an illustration shown in FIG. 9. In the exemplary embodiment includes a pair of printing controller carriages 490, 492. The printer operating subassembly 500 is representative of any number of printing controller carriages 490, 492, including a single printing controller carriage 490. Each printing controller carriage 490, 492 is independently controlled and operated.

The printing process is accomplished by positioning a specific print head above a specific longitudinal and lateral location over a target object, such as a paper 599. This is accomplished by moving the paper 599 in a first direction (referenced as being longitudinal) and positioning the desired print head 430, 432, 434, 436, 470, 472, 474, 476 by moving the associated printing controller carriage 490, 492 in a second direction (referenced as being lateral). It is understood that the first direction and the second direction are preferably perpendicular respective to one another.

The position of the target object, such as the paper 599, is controlled by a series of paper feed rollers 552 rotated by a paper feed roller shaft 550. Rotation of each of the paper feed roller shafts 550 is driven by any known rotational drive mechanism, such as a belt or a series of gears in operational communication with a motor.

A printer carriage guide shaft 510 is arranged laterally within the printer. Each printing controller carriage 490, 492 is slideably assembled to the printer carriage guide shaft 510. It is understood that any sliding interface can be used between each printing controller carriage 490, 492 and the printer carriage guide shaft 510, such as a slide bushing or bearing. Lateral positioning of each printing controller carriage 490, 492 along the printer carriage guide shaft 510 is provided by a precision motion controller. The exemplary precision motion controller includes a carriage controller motor 530, 532, which rotates a respective carriage controller motor drive gear 522, 532. The carriage controller motor drive gear 522, 532 drives a respective carriage controller motor drive belt 524, 534. Each printing controller carriage 490, 492 is connected to the associated carriage controller motor drive belt 524, 534 by a respective carriage motion coupler 528, 538. The combination of the paper longitudinal feed system 550, 552 and the printer controller carriage lateral positioning system locates the selected print head 430, 432, 434, 436, 470, 472, 474, 476 at the precise coordinates over the paper 599.

The printer configuration having multiple groups of unique ink based formulations limits the available area for printing. This can be optimized by utilizing a remotely located ink reservoir and by combining print heads, such in the multi-base formulation ink printer cartridge system 400. Separating each group into a respective printing controller carriage 490, 492 reduces carried weight, thus improving speed and accuracy, as illustrated in FIGS. 7 through 9. The method of determining the available printing area is best described in the exemplary bottom view of the printer operating subassembly 500, illustrated in FIG. 9. It is noted that several elements are identified in FIG. 8 and omitted from FIG. 9 for clarity.

The available printing area for each print head is from a left side of the print head when the carriage 490, 492 is positioned to the far right side of the printer and a right side of the same print head when the carriage 490, 492 is positioned to the far left side of the printer. For example, when printing black ink having the first ink base formulation (using the black, first ink base formulation print head ink applicator 430), the available printing span is identified as a black, first ink base formulation printing span 560. Similarly, when printing the colored inks (non-black ink) having the first ink base formulation (using the first-colored ink, first ink base formulation print head ink applicator 432, the second-colored ink, first ink base formulation print head ink applicator 434, and the third-colored ink, first ink base formulation print head ink applicator 436), the available printing span is identified as a colored, first ink base formulation printing span 562. Therefore, when printing all of the inks having the first ink base formulation, the overlapping available print area is identified as a overall, first ink base formulation printing span 564.

When printing black ink having the second ink base formulation (using the black, second ink base formulation print head ink applicator 470), the available printing span is identified as a black, second ink base formulation printing span 570. Similarly, when printing the colored inks (non-black ink) having the second ink base formulation (using the second-colored, second ink base formulation print head ink applicator 472, the second-colored, second ink base formulation print head ink applicator 474, and the third-colored, second ink base formulation print head ink applicator 476), the available printing span is identified as a colored, second ink base formulation printing span 572. Therefore, when printing all of the inks having the second ink base formulation, the overlapping available print area is identified as a overall, second ink base formulation printing span 574.

When considering the combination of all inks having all ink base formulations, the available print area is limited to a lateral printable span 579. It is noted that the paper 599 is illustrated in broken lines and located within the 579. It is also noted that the drawings are not to scale and the impact of the printing configuration is less than what is shown in the illustration.

Figure 10:
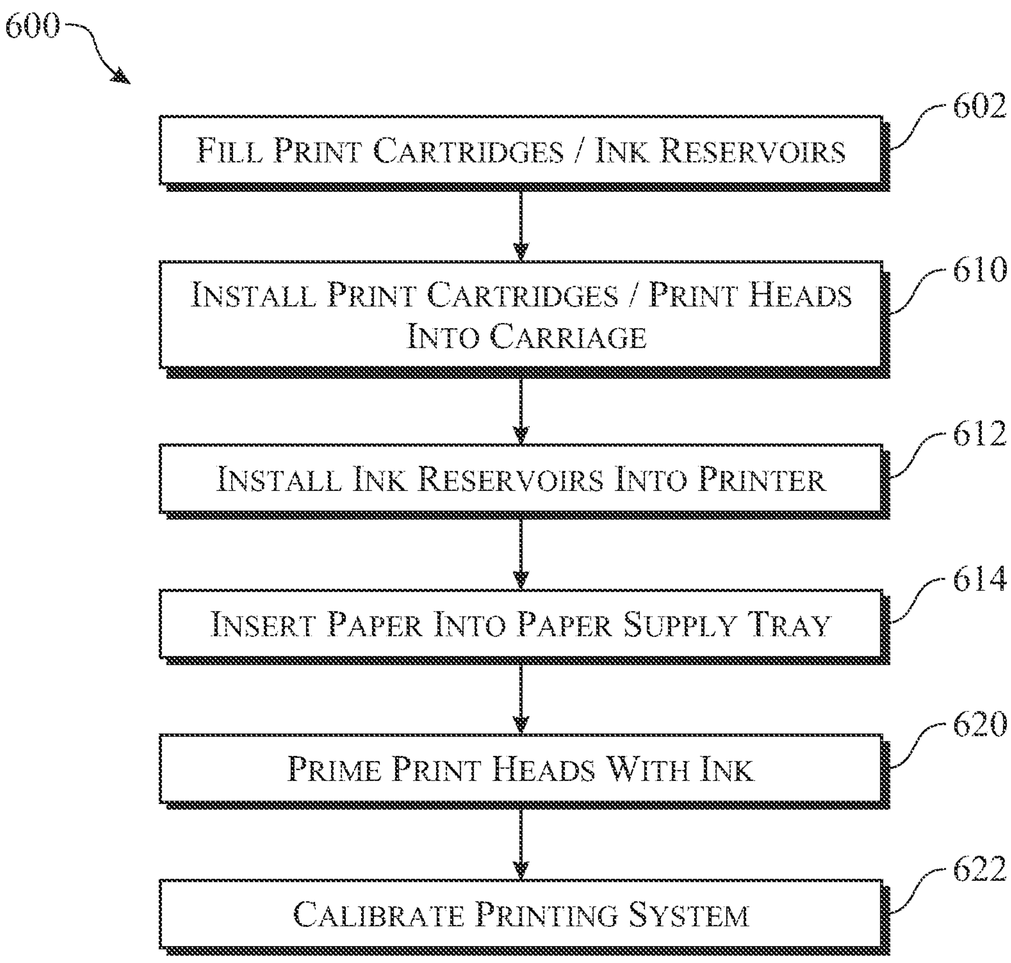
FIG. 10 presents an exemplary ink printer preparation flow diagram detailing steps for preparing a printing system comprising at least two groups of ink, each group of ink having a unique ink base formulation.

Preparation for the printing process is described in a ink printer preparation flow diagram 600, which is presented in FIG. 10. Each ink storage component of the cartridge or the remote reservoir is filled (block 602). The process for transferring ink into the ink storage compartment can be accomplished using any known ink filling process, including those incorporated by reference. The process can include portions or all of the processes taught in any of the following:

U.S. patent application Ser. No. 14/011,683 filed on Aug. 27, 2013 (scheduled to issue as U.S. Pat. No. 8,960,868 on Feb. 24, 2015); U.S. Pat. No. 8,567,929 issued on Oct. 29, 2013;
U.S. Pat. No. 8,403,466 issued on Mar. 26, 2013;
U.S. Pat. No. 8,157,524 issued on Aug. 27, 2012;
U.S. Pat. No. 8,157,362 issued on Apr. 17, 2012;
U.S. Pat. No. 8,096,630 issued on Jan. 17, 2012; and
U.S. patent application Ser. No. 11/342,442, filed Jan. 30, 2006.

Once the ink storage component are filled, they are either distributed to wholesale outlets, retail outlets, or directly to consumers to eventually be installed into a print carriage of a printer (block 610). It is also noted that the ink storage components can be refilled by the consumer, a refill merchant, and the like using any known refill process, including those incorporated by reference and presented above. In a configuration where the printer utilizes remote ink reservoirs, the remote ink reservoirs are installed into the printer or the appropriate location (block 612). The object to receive the printed image (such as paper 599) is placed into the printer (block 614). The object to receive the printed image is inserted into the appropriate location of the printer. In one example, a stack of paper 599 would be placed into a paper tray. In another example, a compact disc would be placed into a compact disc support frame. The printer can optionally prime each print head with ink (step 620). In a configuration including remote ink reservoirs, the priming process includes a step of transferring ink from the remote ink reservoir to a storage container provided within the printer cartridge assembly. The system can include a print head calibration step to provide a registration between the longitudinal motion controllers, the lateral motion controllers, and each print head (block 622). The calibration can be accomplished using any calibration process known by those skilled in the art.

Figure 11:
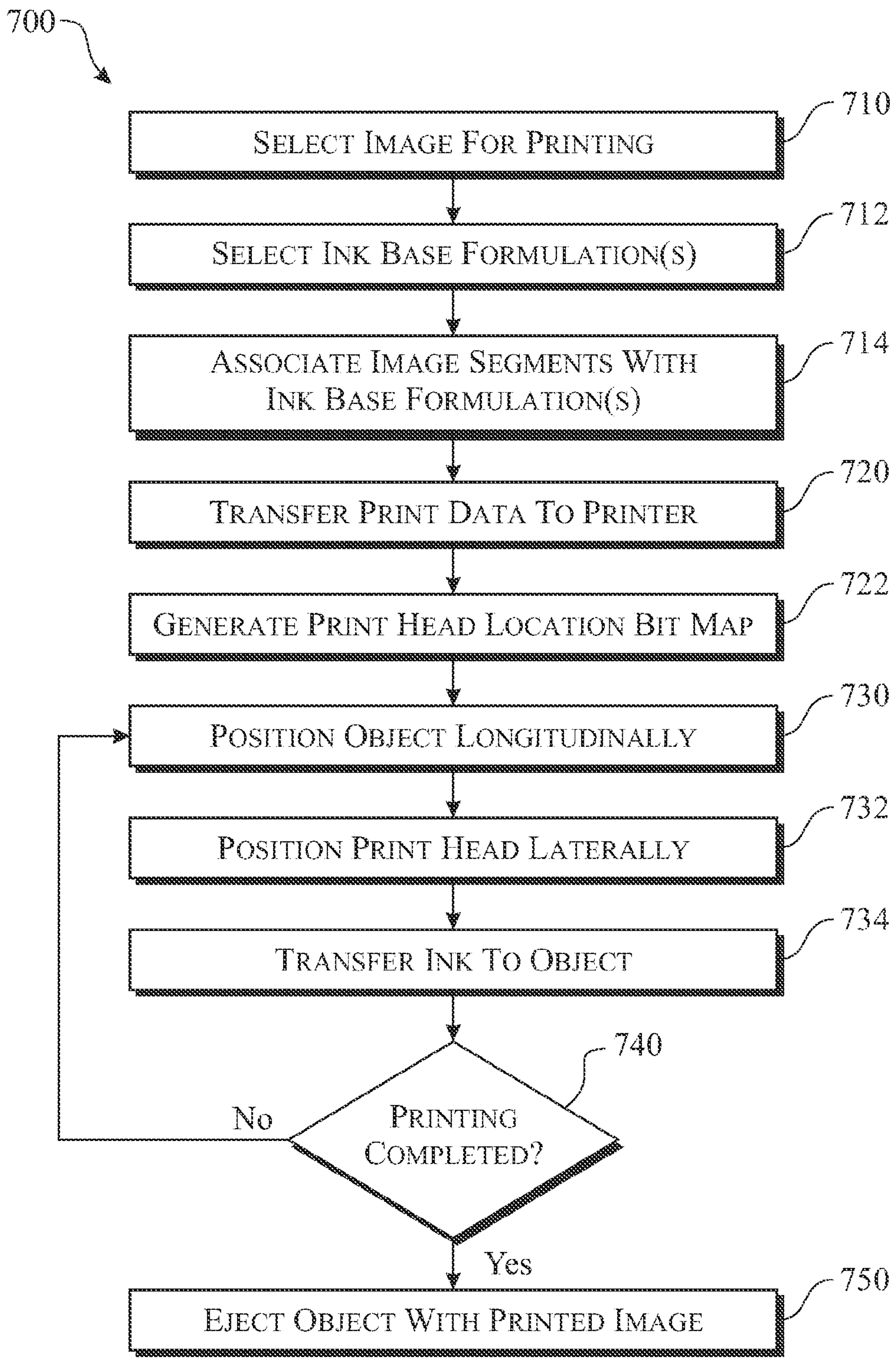
FIG. 11 presents an exemplary selective ink formulation printing operational flow diagram detailing operation of a printing system comprising at least two groups of ink, each group of ink having a unique ink base formulation.

The actual printing process is described in a selective ink formulation printing operational flow diagram 700, which is presented in FIG. 11. The user selects one or more images for printing (block 710). Printing is accomplished by selecting the desired ink base formulation. The selection determines which print head group or groups (a first ink based print head group comprising the black, first ink base formulation print head ink applicator 430, the first-colored ink, first ink base formulation print head ink applicator 432, the second-colored ink, first ink base formulation print head ink applicator 434, and the third-colored ink, first ink base formulation print head ink applicator 436, and/or a second ink based print head group comprising the black, second ink base formulation print head ink applicator 470, the second-colored, second ink base formulation print head ink applicator 472, the second-colored, second ink base formulation print head ink applicator 474, and the third-colored, second ink base formulation print head ink applicator 476) are to be used for printing the desired image.

The images can be printed using an ink group having a single ink base formulation (block 712).

In an alternative selection, the user can select multiple ink groups (block 714). In the multiple group scenario, the user would need to segment the image and associate each segment with a specific ink based formulation. The image can be segmented using any suitable segmenting processes, including layers, colors, line styles, fill patterns, and the like. The user would identify each ink base formulation with each portion of the image or layer.

The user can establish other print parameters, such as paper size, quality of the print, and the like. Once the printing process is configured, the user selects a print icon, which initiates a print spooling process. The print spooling process creates a printer image file.

The printer image file is transferred to the printer (block 720). More specifically. data associated with the image and ink base formulation selection is transferred to the printer. The printer utilizes the received data to print the image using groups of ink having the selected ink base formulation or formulations. The printing process would be completed by injecting the concept of selecting one or more ink groups for printing, where each ink group is a composition based upon a unique ink base formulation. In one example, the printer would configure or utilize a print head location bit map (block 722). The print head location bit map can be generated by the source device, the printer, or any other suitable printer processing device.

The combination of the paper longitudinal feed system 550, 552 and the printer controller carriage lateral positioning system locates the selected print head 430, 432, 434, 436, 470, 472, 474, 476 at the precise coordinates over the paper 599. The paper longitudinal feed system 550, 552 locates the target object at the appropriate longitudinal position (block 730). The printer controller carriage lateral positioning system (the first ink composition print cartridge printing controller carriage 490 being positionally controlled by the first carriage controller motor 520, first carriage controller motor drive gear 522, first carriage controller motor drive belt 524, first carriage motion controlling gear 526, and first carriage motion coupler 528 and/or the second ink composition print cartridge printing controller carriage 492 being positionally controlled by the second carriage controller motor 530, second carriage controller motor drive gear 532, second carriage controller motor drive belt 534, second carriage motion controlling gear 536, and second carriage motion coupler 538) for location the selected print head 430, 432, 434, 436, 470, 472, 474, 476 at the appropriate lateral position (block 732).

Upon proper placement of the selected print head 430, 432, 434, 436, 470, 472, 474, 476, respective to the longitudinal position of the target object 599, the multi-base formulation ink printer cartridge system 400 transfers a matrix of pixels of ink from the selected print head 430, 434, 434, 436, 470, 472, 474, 476 onto the target object, such as the paper 599 (block 734). Upon completing a lateral pass of the first ink composition print cartridge printing controller carriage 490 and/or second ink composition print cartridge printing controller carriage 492, the controller determines if the printing process is completed. If the printing process is not complete, the process returns to the positioning steps of blocks 730 and 732. If the printing process is complete, the printer ejects the object having the printed image deposited thereon (block 750). it is understood that any two or more print heads 430, 432, 434, 436, 470, 472, 474, 476 can simultaneously print ink, wherein each printing transfer would occur when that specific print head 430, 432, 434, 436, 470, 472, 474, 476 is in its proper location.

It is understood that each ink base formulation may require post print processing. In these conditions, the printer would continue by providing any necessary post print processing. such as heat curing, drying, coating, and the like.

Although the disclosure describes certain variations, it is understood that the intentions of the present invention are to provide two or more groups of ink, each group having ink with the group's own unique ink base formulation and an associated print head designed to print the ink having the group's own unique ink base formulation. Each of the two or more groups of ink and associated supporting elements would be simultaneously available for printing by the printer.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

REFERENCE ELEMENT DESCRIPTIONS

Ref. No. Description

100 bottle pour
100 multi-base formulation ink printer cartridge
110 first ink base formulation section
120 black, first ink base formulation subsection
121 black, first ink base formulation
122 first-colored, first ink base formulation subsection
123 first-colored, first ink base formulation
124 second-colored, first ink base formulation subsection
125 second-colored, first ink base formulation
126 third-colored, first ink base formulation subsection
127 third-colored, first ink base formulation
129 first ink base formulation section sponge
130 black, first ink base formulation print head ink applicator
131 black, first ink base formulation print head controller circuit
132 first-colored ink, first ink base formulation print head ink applicator
133 color print head controller circuit
134 second-colored ink, first ink base formulation print head ink applicator
136 third-colored ink, first ink base formulation print head ink applicator
139 first ink based formulation ink print head controller circuit contacts
150 second ink base formulation section
160 black, second ink base formulation subsection
161 black, second ink base formulation
162 first-colored, second ink base formulation subsection
163 first-colored, second ink base formulation
164 second-colored, second ink base formulation subsection
165 second-colored, second ink base formulation
166 third-colored, second ink base formulation subsection
167 third-colored, second ink base formulation
169 second ink base formulation section sponge
170 black, second ink base formulation print head ink applicator
171 black, second ink base formulation print head controller circuit
172 second-colored, second ink base formulation print head ink applicator
173 color, second ink base formulation print head controller circuit
174 second-colored, second ink base formulation print head ink applicator
176 third-colored, second ink base formulation print head ink applicator
179 second ink based formulation ink print head controller circuit contacts
200 multi-base formulation ink printer cartridge system
210 first ink base formulation cartridge grouping
220 black, first ink base formulation cartridge
221 black, first ink base formulation
222 first-colored, first ink base formulation cartridge
223 first-colored, first ink base formulation
224 second-colored, first ink base formulation cartridge
225 second-colored, first ink base formulation
226 third-colored, first ink base formulation cartridge
227 third-colored, first ink base formulation
229 first ink base formulation section sponge
230 black, first ink base formulation print head ink applicator
231 black, first ink base formulation print head controller circuit
232 first-colored ink, first ink base formulation print head ink applicator
233 first-colored ink, first ink base formulation print head controller circuit
234 second-colored ink, first ink base formulation print head ink applicator
235 second-colored ink, first ink base formulation print head controller circuit
236 third-colored ink, first ink base formulation print head ink applicator
237 third-colored ink, first ink base formulation print head controller circuit
239 first ink base formulation print head controller circuit contacts
250 second ink base formulation cartridge grouping
260 black, second ink base formulation cartridge
261 black, second ink base formulation
262 first-colored, second ink base formulation cartridge
263 first-colored, second ink base formulation
264 second-colored, second ink base formulation cartridge
265 second-colored, second ink base formulation
266 third-colored, second ink base formulation cartridge
267 third-colored, second ink base formulation
269 second ink base formulation section sponge
270 black, second ink base formulation print head ink applicator
271 black, second ink base formulation print head controller circuit
272 first-colored ink, second ink base formulation print head ink applicator
273 first-colored ink, second ink base formulation print head controller circuit
274 second-colored ink, second ink base formulation print head ink applicator
275 second-colored ink, second ink base formulation print head controller circuit
276 third-colored ink, second ink base formulation print head ink applicator
277 third-colored ink, second ink base formulation print head controller circuit

279 second ink base formulation print head controller circuit contacts
300 multi-base formulation ink printer cartridge
310 first ink base formulation section
320 black, first ink base formulation subsection
322 first-colored, first ink base formulation print head ink volume supply subsection
323 first-colored, first ink base formulation
324 second-colored, first ink base formulation print head ink volume supply subsection
326 third-colored, first ink base formulation print head ink volume supply subsection
328 first ink base formulation print head ink storage bag
330 black, first ink base formulation print head ink applicator
331 black, first ink base formulation print head controller circuit
332 first-colored ink, first ink base formulation print head ink applicator
333 color print head controller circuit
334 second-colored ink, first ink base formulation print head ink applicator
336 third-colored ink, first ink base formulation print head ink applicator
340 black, first ink base formulation remote reservoir
342 first-colored, first ink base formulation remote reservoir
343 first-colored, first ink base formulation
344 second-colored, first ink base formulation remote reservoir
346 third-colored, first ink base formulation remote reservoir
348 first ink base formulation remote reservoir ink storage bag
349 remote reservoir to print head ink transfer conduit
350 second ink base formulation section
360 black, second ink base formulation subsection
362 first-colored, second ink base formulation print head ink volume supply subsection
364 second-colored, second ink base formulation print head ink volume supply subsection
366 third-colored, second ink base formulation print head ink volume supply subsection
369 second ink base formulation section sponge
370 black, second ink base formulation print head ink applicator
371 black, second ink base formulation print head controller circuit
372 second-colored, second ink base formulation print head ink applicator
373 second-color, second ink base formulation print head controller circuit
374 second-colored, second ink base formulation print head ink applicator
376 third-colored, second ink base formulation print head ink applicator
379 ink print head controller circuit contacts
380 black, second ink base formulation remote reservoir
382 first-colored, second ink base formulation remote reservoir
384 second-colored, second ink base formulation remote reservoir
386 third-colored, second ink base formulation remote reservoir
390 print cartridge printing controller carriage
400 multi-base formulation ink printer cartridge system
410 first ink base formulation cartridge
420 black, first ink base formulation subsection
422 first-colored, first ink base formulation subsection
424 second-colored, first ink base formulation subsection
426 third-colored, first ink base formulation subsection
430 black, first ink base formulation print head ink applicator
431 black, first ink base formulation print head controller circuit
432 first-colored ink, first ink base formulation print head ink applicator
433 color print head controller circuit
434 second-colored ink, first ink base formulation print head ink applicator
436 third-colored ink, first ink base formulation print head ink applicator
440 black, first ink base formulation remote reservoir
442 first-colored, first ink base formulation remote reservoir
444 second-colored, first ink base formulation remote reservoir
446 third-colored, first ink base formulation remote reservoir
449 remote reservoir to print head ink transfer conduit
450 second ink base formulation cartridge
460 black, second ink base formulation subsection
462 first-colored, second ink base formulation subsection
464 second-colored, second ink base formulation subsection
466 third-colored, second ink base formulation subsection
470 black, second ink base formulation print head ink applicator
471 black, second ink base formulation print head controller circuit
472 second-colored, second ink base formulation print head ink applicator
473 second-color, second ink base formulation print head controller circuit
474 second-colored, second ink base formulation print head ink applicator
476 third-colored, second ink base formulation print head ink applicator
480 black, second ink base formulation remote reservoir
482 first-colored, second ink base formulation remote reservoir
484 second-colored, second ink base formulation remote reservoir
486 third-colored, second ink base formulation remote reservoir
490 first ink composition print cartridge printing controller carriage
492 second ink composition print cartridge printing controller carriage
500 printer operating subassembly
510 printer carriage guide shaft
520 first carriage controller motor
522 first carriage controller motor drive gear
524 first carriage controller motor drive belt
526 first carriage motion controlling gear
528 first carriage motion coupler
530 second carriage controller motor
532 second carriage controller motor drive gear
534 second carriage controller motor drive belt
536 second carriage motion controlling gear
538 second carriage motion coupler
550 paper feed roller shaft
552 paper feed roller
560 black, first ink base formulation printing span 562 colored, first ink base formulation printing span
564 overall, first ink base formulation printing span
570 black, second ink base formulation printing span
572 colored, second ink base formulation printing span
574 overall, second ink base formulation printing span
579 lateral printable span
599 paper
600 ink printer preparation flow diagram
602 fill ink cartridges storage containers step
610 install ink print cartridges and/or print heads into printer carriage step
612 optionally install ink storage remote reservoir into printer step
614 insert object to receive print into the printer step
620 prime print heads with ink step
622 calibrate printing system step
700 selective ink formulation printing operational flow diagram
710 image selection for printing step
712 ink base formulation selection step
714 segment image by ink base formulation and association of image segments with ink based formulations step
720 transfer image print data to printer step
722 generate print head location bit mapping step
730 position object longitudinally step
732 position print head laterally step
734 transfer ink to the object in accordance with the bit map step
740 printing complete decision step
750 eject object with printed image step

What is claimed is:

1. An ink printing system, comprising:

a plurality of ink storage containers, the plurality of ink storage containers segmented into at least two groups of ink storage containers, each group of ink storage containers containing a group of ink volumes, each group of ink volumes having a unique ink base formulation; and a plurality of print heads for printing an image, the print heads being segmented into at least two groups of ink formulation specific print heads, each group of ink formulation specific print heads being in fluid communication with the group of ink storage containers containing a group of ink volumes associated with a compatible ink formulation, wherein a first group of ink volumes within a first group of the at least two groups of ink storage containers is water based, wherein a second group of ink volumes within a second group of the at least two groups of ink storage containers is non-water based, and wherein the second group of ink volumes is formulated having a base formulation selected from a non-water based ink formulation group, wherein the non-water based ink formulation group consists of a solvent based ink formulation, an ultra-violet (UV) curable based ink formulation, and a dye sublimation based ink formulation.

2. An ink printing system as recited in claim 1, further comprising:

a controller, wherein the controller selects a desired ink base formulation for printing from one group of ink volumes, and wherein the printing system dispenses ink in accordance with the selected desired group of ink volumes from the group of ink storage containers associated with the selected desired ink base formulation, using the print head associated with the selected desired ink base formulation.

3. An ink printing system as recited in claim 1, wherein the plurality of ink storage containers comprises:

at least one ink storage container storing black ink having a first ink base formulation; and at least one ink storage container storing black ink having a second ink base formulation.

4. An ink printing system as recited in claim 3, wherein the plurality of ink storage containers further comprises:

at least one ink storage container storing a color ink having a first ink base formulation, wherein the color is a color other than black; and at least one ink storage container storing a color ink having a second ink base formulation, wherein the color is a color other than black.

5. An ink printing system as recited in claim 1, wherein the plurality of ink storage containers comprises:

at least one ink storage container storing a color ink having a first ink base formulation, wherein the color is a color other than black; and at least one ink storage container storing a color ink having a second ink base formulation, wherein the color is a color other than black.

6. An ink printing system as recited in claim 1, further comprising:

at least one cartridge, each of the at least one cartridge comprising:

at least one ink storage container of the plurality of ink storage containers, each at least one ink storage container containing a volume of ink, and at least one print head of the plurality of print heads, wherein each of the at least one print head is in fluid communication with an associated ink storage container of the plurality of ink storage containers, the associated ink storage container containing a volume of associated ink having an associated ink base formulation, and the associated print head being compatible with the associated ink formulation.

7. An ink printing system as recited in claim 1, further comprising at least one print head subassembly, wherein the at least one print head subassembly carries at least one print head of the plurality of print heads, each of the at least one print head subassembly is carried by a positioning control system and move during use, wherein the plurality of ink storage containers are configured as remote ink reservoirs, wherein each remote ink reservoir is detachable assembled to an associated print head subassembly of the at least one print head subassembly and in fluid communication with each associated print head of the plurality of print heads.

8. An ink printing system as recited in claim 1, wherein the plurality of ink storage containers comprises:

at least one remote ink reservoir, wherein the at least one remote ink reservoir is maintained in a fixed position; and the plurality of print heads are carried by a positioning control system and move during use.

9. An ink printing system as recited in claim 1, wherein each group of ink formulation specific print heads of the at least two groups of ink formulation specific print heads is carried by an associated positioning control system, wherein each group of ink formulation specific print heads moves independent of the other groups of ink formulation specific print heads during use.

10. An ink printing system, comprising:

a printer comprising:

at least one print cartridge printing controller carriage moveably assembled therein, wherein the at least one print cartridge printing controller carriage moves along a first direction, and a target object feed system adapted to move a target object in a second direction, wherein the first direction and the second direction are generally perpendicular to one another;

a plurality of ink storage containers, the plurality of ink storage containers segmented into at least two groups of ink storage containers, each group of ink storage containers containing a group of ink volumes, each group of ink volumes having a unique ink base formulation; and a plurality of print heads for printing an image, the print heads being segmented into at least two groups of ink formulation specific print heads, each group of ink formulation specific print heads being in fluid communication with the group of ink storage containers containing a group of ink volumes associated with a compatible ink formulation, wherein a first group of ink volumes within a first group of the at least two groups of ink storage containers is water based, wherein a second group of ink volumes within a second group of the at least two groups of ink storage containers is non-water based, and wherein the second group of ink volumes is formulated having a base formulation selected from a non-water based ink formulation group, wherein the non-water based ink formulation group consists of a solvent based ink formulation, an ultra-violet (UV) curable based ink formulation, and a dye sublimation based ink formulation, wherein the plurality of print heads are carried by the at least one print cartridge printing controller carriage.

11. An ink printing system as recited in claim 10, further comprising:

a controller, wherein the controller selects a desired ink base formulation for printing from one group of ink volumes, and wherein the printing system dispenses ink in accordance with the selected desired group of ink volumes from the group of ink storage containers associated with the selected desired ink base formulation, using the print head associated with the selected desired ink base formulation.

12. An ink printing system as recited in claim 10, wherein the plurality of ink storage containers comprises:

at least one ink storage container storing black ink having a first ink base formulation; and at least one ink storage container storing black ink having a second ink base formulation.

13. An ink printing system as recited in claim 12, wherein the plurality of ink storage containers further comprises:

at least one ink storage container storing a color ink having a first ink base formulation, wherein the color is a color other than black; and at least one ink storage container storing a color ink having a second ink base formulation, wherein the color is a color other than black.

14. An ink printing system as recited in claim 10, wherein the plurality of ink storage containers comprises:

at least one ink storage container storing a color ink having a first ink base formulation, wherein the color is a color other than black; and at least one ink storage container storing a color ink having a second ink base formulation, wherein the color is a color other than black.

15. An ink printing system as recited in claim 10, further comprising:

at least one cartridge, each of the at least one cartridge comprising:

at least one ink storage container of the plurality of ink storage containers, each at least one ink storage container containing a volume of ink, and at least one print head of the plurality of print heads, wherein each of the at least one print head is in fluid communication with an associated ink storage container of the plurality of ink storage containers, the associated ink storage container containing a volume of associated ink having an associated ink base formulation, and the associated print head being compatible with the associated ink formulation.

16. An ink printing system as recited in claim 10, further comprising at least one print head subassembly, wherein the at least one print head subassembly carries at least one print head of the plurality of print heads, each of the at least one print head subassembly is carried by a positioning control system and move during use, wherein the plurality of ink storage containers are configured as remote ink reservoirs, wherein each remote ink reservoir is detachable assembled to an associated print head subassembly of the at least one print head subassembly and in fluid communication with each associated print head of the plurality of print heads.

17. An ink printing system as recited in claim 10, wherein the plurality of ink storage containers comprises:

at least one remote ink reservoir, wherein the at least one remote ink reservoir is maintained in a fixed position; and the plurality of print heads are carried by a positioning control system and move during use.

18. An ink printing system as recited in claim 10, wherein each group of ink formulation specific print heads of the at least two groups of ink formulation specific print heads is carried by an associated positioning control system, wherein each group of ink formulation specific print heads moves independent of the other groups of ink formulation specific print heads during use.

* * * * *